(12) United States Patent
Takeuchi

(10) Patent No.: US 6,402,615 B1
(45) Date of Patent: Jun. 11, 2002

(54) OBJECT DISPLAY METHOD, COMPUTER READABLE PROGRAM PRODUCT AND PROGRAM FOR DISPLAYING AN OBJECT AND GAME SYSTEM

(75) Inventor: Hisahiko Takeuchi, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/606,239

(22) Filed: Jun. 29, 2000

(30) Foreign Application Priority Data

Jan. 28, 2000 (JP) ........................................ 2000-020956

(51) Int. Cl.$^7$ ................................................ A63F 13/00
(52) U.S. Cl. ................................ 463/31; 463/9; 463/32; 345/419; 345/138; 345/422; 345/425
(58) Field of Search ........................ 463/9, 32; 345/425, 345/419, 138, 422

(56) References Cited

U.S. PATENT DOCUMENTS

| | | | | |
|---|---|---|---|---|
| 5,396,583 A | * | 3/1995 | Chen et al. | 345/427 |
| 5,643,085 A | * | 7/1997 | Aityan et al. | 463/9 |
| 5,734,807 A | * | 3/1998 | Sumi | 345/427 |
| 5,877,769 A | * | 3/1999 | Shinohara | 345/425 |
| 5,926,184 A | * | 7/1999 | Shimizu | 345/422 |
| 6,030,289 A | * | 2/2000 | Nomi et al. | 463/32 |
| 6,034,691 A | * | 3/2000 | Anono et al. | 345/425 |
| 6,062,978 A | * | 5/2000 | Martino et al. | 463/9 |
| 6,215,495 B1 | * | 4/2001 | Grantham et al. | 345/419 |
| 6,226,003 B1 | * | 5/2001 | Akeley | 345/419 |
| 6,268,846 B1 | * | 7/2001 | Georgiev | 345/138 |

OTHER PUBLICATIONS

Cabral et al., Reflection Space Image Based Rendering, 1999, pp 165–171.*
Halle, Michael, Multiple Viewpoint Rendering.*
Weinhaus et al., Texture Mapping 3D Models of Real–World Scenes, Dec. 1997, pp 325–365.*
Debevec, Paul, Rendering Synthetic Objects into Real Scenes: Bridging Traditional and Image Based Graphics with Global Illumination and High Dynamic Range Photography, 1998, pp 1–10.*
Andreas Schilling, Towards Real–Time Photorealistic Rendering: Challenges and Solutions, 1997, pp 7–15.*

* cited by examiner

Primary Examiner—Jessica J. Harrison
Assistant Examiner—Yveste G. Cherubin
(74) Attorney, Agent, or Firm—Greenblum & Bernstein, P.L.C.

(57) ABSTRACT

An object display method for displaying an object from a direction of a viewpoint in a virtual three-dimensional space of a video game. The viewpoint and an object are arranged in a cylinder, on an inner surface of which a reflection image expressing the environment is provided, in accordance with predetermined rules or player operation. A partial area of the cylinder to be provided with a reflection image to be reflected on the object in accordance with the positions of the viewpoint and the object is judged. The image linked with the determined partial area of the cylinder combined with the image of the object is then displayed. The method may be incorporated into a computer readable program product that is associated with a display, for displaying an object, and a game console.

16 Claims, 15 Drawing Sheets

Fig.9

| | | | |
|---|---|---|---|
| SCROLL PARALLEL AXIS DATA $A_p$ | X | 0 | 170A |
| | Y | 0 | |
| | Z | 1 | |
| SCROLL HORIZONTAL AXIS DATA $A_h$ | Z | 0 | 170B |
| | X | 1 | |
| | Y | 0 | |
| SCROLL VERTICAL AXIS DATA $A_v$ | Y | 1 | 170C |
| | Z | 0 | |
| SCROLL SCALE VALUE $S_c$ | | 0.01 | 170D |
| INFINITELY FAR COLOR DATA $C_f$ | | (0,0,0) | 170E |
| MAPPING TEXTURE STANDARD COLOR DATA $C_r$ | | (128,128,128) | 170F |

170

OBJECT DISPLAY METHOD, COMPUTER READABLE PROGRAM PRODUCT AND PROGRAM FOR DISPLAYING AN OBJECT AND GAME SYSTEM

The present disclosure relates to subject matter contained in Japanese Patent Application No. 2000-020956, filed on Jan. 28, 2000, the disclosure of which is expressly incorporated herein by reference in its entirety.

BACKGROUND OF THE INVENTION

1. Field of the Invention

The present invention relates to an object display method enabling the display of a reflection image reflected from an environment of a virtual moving object on to the moving object, a computer readable program product and program for displaying the object on a game screen, and a game system using the same.

2. Description of the Related Art

An increasing number of recent video games have been so-called 3D games. In such games, virtual objects called three-dimensional characters and formed by polygons are arranged in a virtual three-dimensional space and an image of the field of vision seen from a predetermined perspective is generated and displayed on the screen. For example, one practice has been to display a reflection image reflected from the surroundings of a moving object such as an automobile or train or a stationary object such as a building on the inner surface of the object superposed on the image representing the object. This technique is called environment reflection mapping or simply reflection mapping.

The most frequently used environment reflection mapping technique is spherical reflection mapping. According to this technique, a reflection image representing the environment of an object is determined corresponding to the inner surface of a sphere centered about the approximate center position of the object. For determining the reflection image portion to be reflected on the surface of the object from the environment, a reflection vector is determined at that surface for a vector extending from a viewpoint determined by the camera position to that surface. Next, the reflection image portion is determined based on the point where the reflection vector reaches the inner surface of the sphere when extending it.

In spherical reflection mapping, no matter what the direction of the reflection vector generated at the surface of the object, it is possible to determine a reflection image portion for that surface. When the object is a moving object, when the viewpoint is stationary, since the vector heading from the viewpoint to the moving object changes along with movement of the object, the reflection image portion reflected on the object changes along with movement of the object. Therefore, the reflection image becomes more realistic.

In video games, there are cases where the moving object is tracked by the camera. In this case, the vector heading from the viewpoint to the moving object does not change much at all, so the reflection vector with respect to that vector also changes. In the above spherical reflection mapping, only a reflection vector is used for determination of the reflection image portion. That is, the sphere for representing the reflection image resulting from the environment is assumed to have an infinitely long radius. Even if the moving object moves, the vector heading from the viewpoint to the moving object does not change. In that state, the reflection image portion on the moving object does not change and so the reflection image lacks realism.

SUMMARY OF THE INVENTION

An object of the present invention is to provide an object display method enabling the display of a reflection image changing in accordance with a moving object even when making a viewpoint track the moving object, a computer readable program product and program for displaying an object, and a game system using the same.

According to a first aspect of the present invention, there is provided an object display method for displaying an object from a direction of a viewpoint in a virtual three-dimensional space of a video game, comprising making the viewpoint and an object arranged in a cylinder, on the inner surface of which a reflection image representing the environment is provided, move in accordance with predetermined rules or player operation; judging a partial area of the cylinder linked with a reflection image to be reflected on the object in accordance with the positions of the viewpoint and the object; and displaying the image corresponding to the determined partial area of the cylinder combined with the image of the object.

According to a second aspect of the present invention, there is provided a computer readable computer product storing a program for displaying an object from a viewpoint in a three-dimensional space of a video game, the program making the computer make the viewpoint and an object arranged in a cylinder, on the inner surface of which a reflection image expressing the environment is provided, move in accordance with predetermined rules or player operation; judging a partial area of the cylinder to be linked with a reflection image to be reflected on the object in accordance with the positions of the viewpoint and the object; and displaying the image corresponding to the determined partial area of the cylinder combined with the image of the object.

According to a third aspect of the present invention, there is provided a program for displaying an object from a viewpoint in a three-dimensional space of a video game, the program making a computer make the viewpoint and an object arranged in a cylinder, on the inner surface of which a reflection image expressing the environment is provided, move in accordance with predetermined rules or player operation; judging a partial area of the cylinder to be linked with a reflection image to be reflected on the object in accordance with the positions of the viewpoint and the object; and displaying the image corresponding to the determined partial area of the cylinder combined with the image of the object.

According to a fourth aspect of the present invention, there is provided a video game system comprising a computer readable program product storing a program for displaying an object from a viewpoint in a three-dimensional space of a video game; a computer for executing at least part of a program from the program product; and a display for displaying a video game executed by the computer; the computer reading at least part of a program from the program product, making the viewpoint and an object arranged in a cylinder, on the inner surface of which a reflection image expressing the environment is provided, move in accordance with predetermined rules or player operation; judging a partial area of the cylinder to be linked with a reflection image to be reflected on the object in accordance with the positions of the viewpoint and the object; and displaying the image corresponding to the determined partial area of the cylinder combined with the image of the object on the display.

BRIEF DESCRIPTION OF THE DRAWINGS

These and other objects and features of the present invention will become clearer from the following description of the preferred embodiments given with reference to the attached drawings, in which:

FIG. 9 is a view of the content of reflection data;

DESCRIPTION OF THE PREFERRED EMBODIMENTS

Preferred embodiments of the object display method, computer readable program product and program for displaying an object, and game system using the same will be explained below with reference to the drawings.

Figure 1:
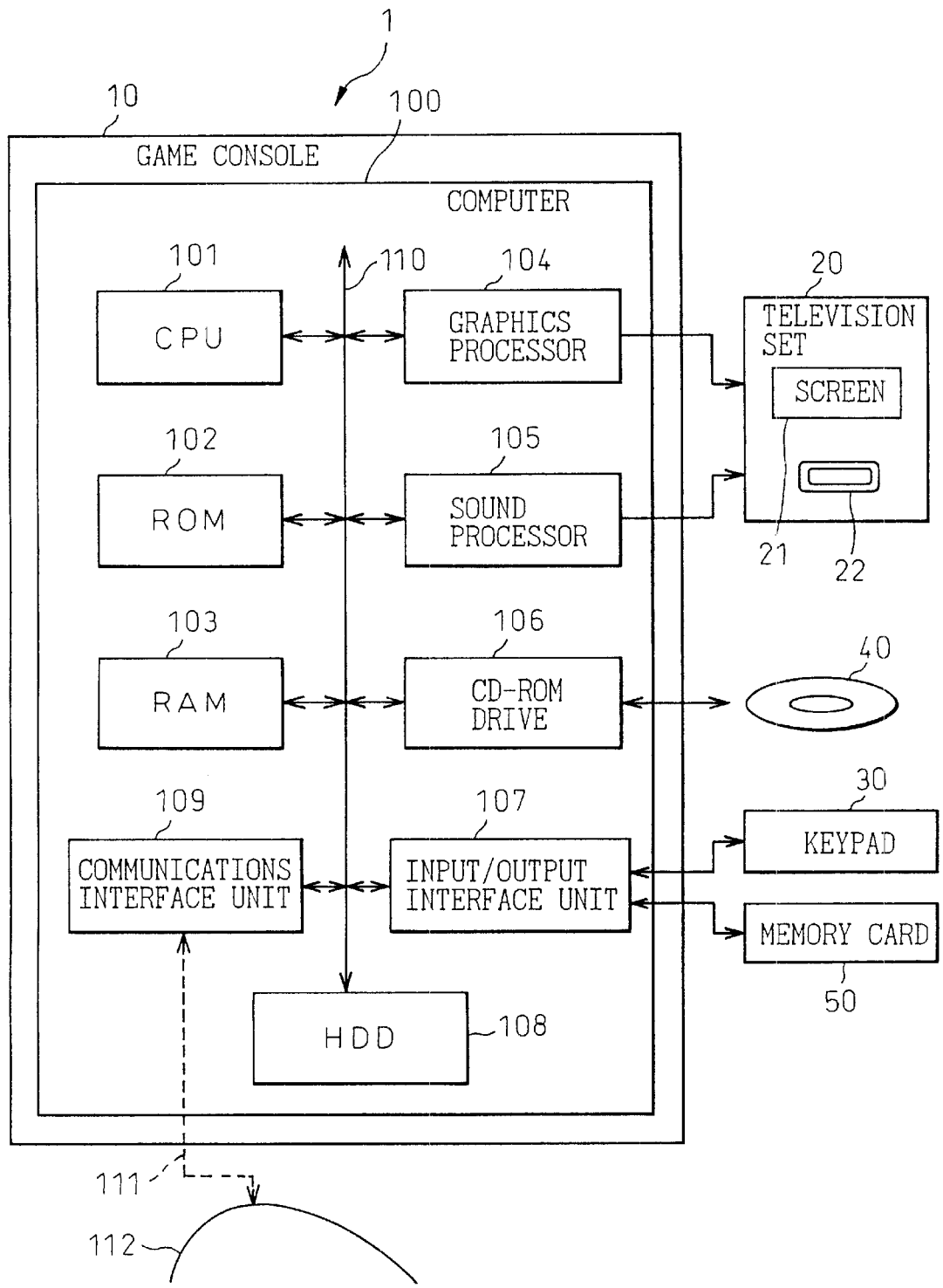
FIG. 1 is a schematic view of a game system with a built-in computer.

As shown in FIG. 1, the game system 1 is for example comprised of a game console 10 able to be loaded with a CD-ROM 40 storing a computer game program according to the present invention and a television set 20 and player operable keypad 30 connected to the same by cables. The game console 10 is for example a home game system and includes a computer 100 accommodated in a single housing.

The player depresses an opening button (not shown) on the game console 10 to open the openable lid (not shown) and loads for example a CD-ROM 40 inside it. The game console 10 executes a computer game program stored on the CD-ROM 40.

The game console 10 has card slots (not shown) corresponding to the keypad 30. An external auxiliary storage medium, that is, a memory card 50, can be inserted into each card slot. The player can freely store the data relating to the characters in the game or the data relating to the state of progress of the game program or other data required for resumption of the game in a memory card 50 inserted in a card slot. When the player suspends the game, then uses the memory card 50 to again start up the game, the game console 10 resumes the game from the suspended portion.

A television set 20 is used as an example of a display device for the game console 10. The television set 20 receives a video signal and audio signal from the game console 10, processes the received video signal to display an image on the screen 21, and outputs a sound corresponding to the received audio signal from speakers 22 attached to the television set 20.

The keypad 30 is generally called a controller and has a plurality of buttons and other operating parts (not shown) for operation by the player. It is used as an example of an input device. The keypad 30 is for example provided with a group of direction keys comprised of for direction keys for moving a cursor displayed on the screen 21 to the left, right, top, and bottom, a select button, start button, triangle (Δ) button, circle (o) button, cross (x) button, and square (o) button.

The computer 100 is for example comprised of a central processing unit (CPU) 101, read only memory (ROM) 102 for storing the instruction string and data required for the CPU 101 to execute the program instructions, a random access memory (RAM) 103 comprising a main memory for temporarily storing the game program to be executed and the data to be used by the game program, a graphic processor 104, sound processor 105, compact disc read only memory (CD-ROM) drive 106 in which a CD-ROM 40 is loaded, input/output interface unit 107, magnetic storage device (HDD) 108, communications interface unit 109, and bus 110 connecting the above circuits.

The CPU 101 decodes and executes program instructions stored in the RAM 103 to control the circuits inside the computer in accordance with the instructions and responds to operational input of the player entered from the keypad 30 through the input/output interface unit 107 and controls the execution of the game program so as to execute program portions corresponding to the operational input. The CPU 101 suitably executes the instruction string stored in the ROM 102 at the time of execution of the program instructions.

The graphic processor 104 includes a not shown video RAM (VRAM) and comprises a frame buffer (not shown) in it. It responds to instructions given from the CPU 101 to draw an image comprised of a plurality of polygons expressing an object on the frame buffer. Further, the graphic processor 104 generates a video signal corresponding to an image stored in the frame buffer, for example, a television signal, and outputs it to a not shown video circuit in the television set 20.

The frame buffer is actually comprised of a pair of frame buffers. The images of a plurality of objects making up a single frame image are stored in one of the pair of frame buffers. When one frame image finishes being produced, the next frame image is stored in the other of the pair of frame memories. In this way, a plurality of frame images are alternately stored in the pair of frame buffers.

The recently stored frame image is read from the other frame buffer among the pair of frame buffers different from the frame buffer being used for storing the current frame image. The frame buffer to be read from is switched in synchronization with the vertical sync signal of the television set 20. The new frame image is also generated in synchronization with this signal. The cycle of the vertical sync signal is the frame image display cycle (or also simply called the frame cycle).

The sound processor 105 generates a sound signal expressing voices, music, sound effects, etc. based on the sound data stored in the ROM 103 and supplies it to the speakers 22 through a not shown audio circuit in the television set 20.

The input/output interface unit 107 is connected to the keypad 30 and a memory card 50 inserted into a card slot (not shown) and controls the data transfer timing between the keypad 30 and memory card 50 and the CPU 101 and other circuits.

The CD-ROM 40 is a recording medium storing a game program and data used by the same. The CD-ROM drive 106 reads the game program and data, stores them in the RAM 103, and supplies them for execution by the CPU 101.

The game program and data used in the game console can be supplied by other methods as well. For example, it is also possible to adopt the method of including the game program in a carrier wave able to be used for communication, transmitting it as a computer data signal for execution by the computer, and receiving it at the game console side.

Specifically, for example, it is also possible to use the communications interface unit 109 to download the game program from another piece of equipment, not shown, on the network connected through the communications line 111. The magnetic storage device (HDD) 108 may be used for storing the game program downloaded in this way and making the game program be executed by the CPU 101 or for other purposes.

Alternatively, it is also possible to store the game program and data in advance in the memory of another piece of equipment, not shown, on the network 112 connected through the communications line 111 and successively store and use the game program and data in the RAM 10 as required through the communications line 111 and network 112. Note that it is also possible to construct the game console 10 so as to enable it to support only one mode of use, that is one of the mode of use of a CD-ROM or mode of use of a magnetic storage device 108.

Figure 2:
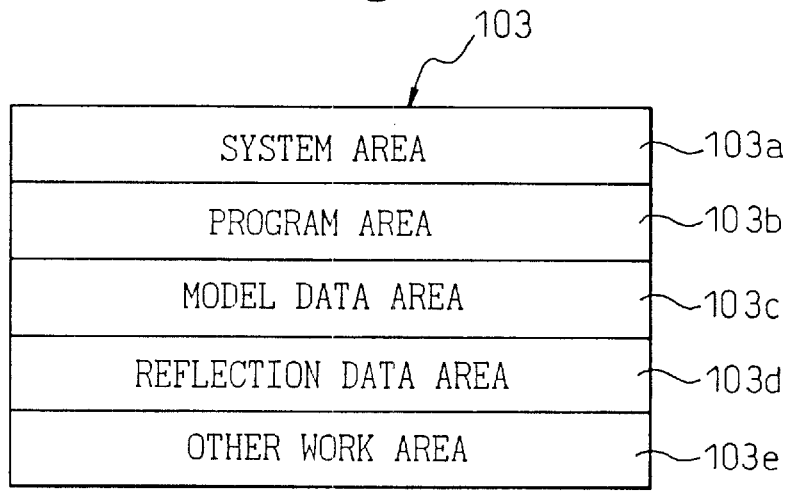
FIG. 2 is a view of an example of a memory map of a RAM in the computer.

In this embodiment, the RAM 103 is used in accordance with the memory map shown in for example FIG. 2 at the time of execution of the game program. A system area 103a stores the system information required for the basic operation for game progress such as an interruption vector indicating a location to jump to in the interruption routine. A program area 103b stores the portion of the game program in execution from the CD-ROM 40.

A model data area 103c stores a plurality of sets of model data for a plurality of objects used in the game. A reflection data area 103d stores reflection data for realizing cylindrical reflection mapping. The above data is all stored from the CD-ROM 40 in a predetermined work area before execution of the game program. Details of the data will be explained later. Another work area 103e is used as a work area for temporarily holding other data at the time of execution of the game program.

The game system using the present invention is not limited to the one illustrated or ones similar to the same. It is of course also possible to use different structures of display devices, input devices, CPUs, or storage media.

Figure 3:
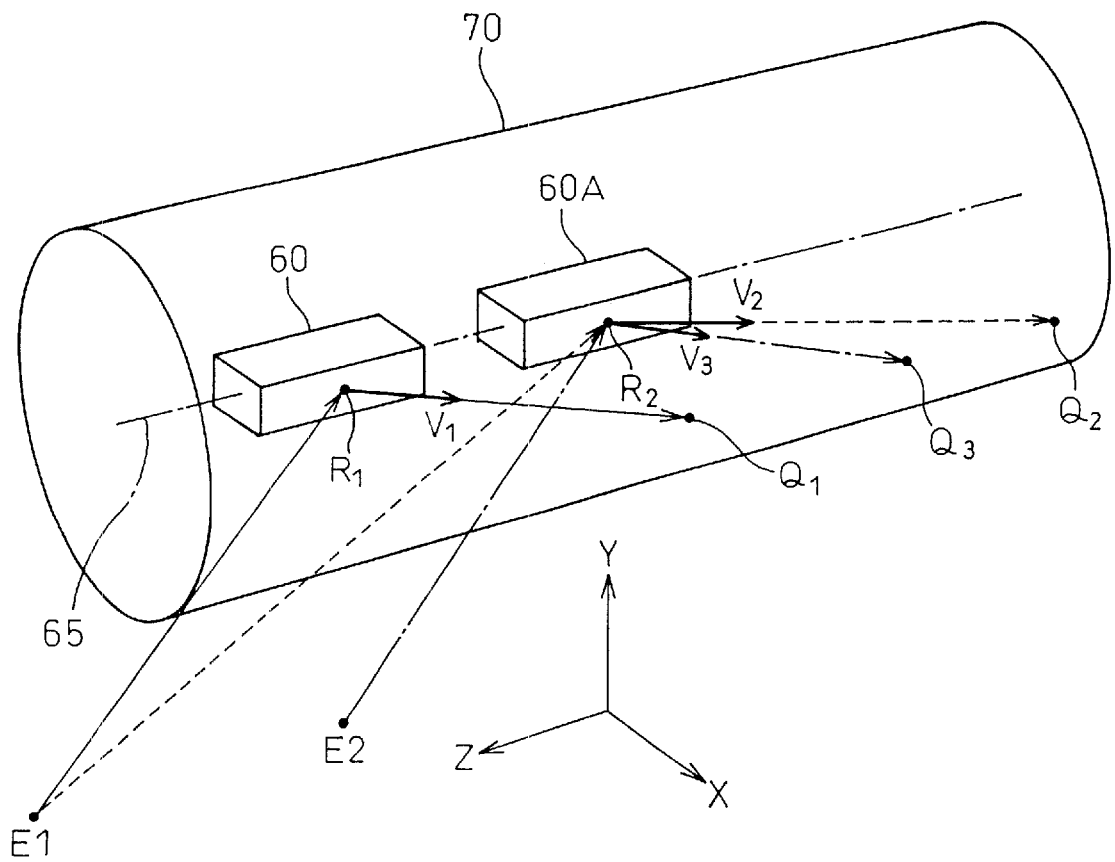
FIG. 3 is a view for explaining cylindrical reflection mapping according to the present invention.

FIG. 3 shows the basic aspects of cylindrical reflecting mapping. The cylinder 70 is schematically defined so as to surround the object displayed in the three-dimensional virtual space. An image representing the environment of the object 60 is drawn on the inner surface of the cylinder 70. The cylinder is an infinite length cylinder having a center axis 65 passing through the center of the object and parallel to the direction of movement of the object 60. The coordinate system in the three-dimensional virtual space is, as shown in the figure, comprised of X-, Y-, and Z-axes. The object 60 is assumed to be one moving continuously parallel to the Z-axis and in the −Z-axis direction at for example a constant speed. The Y-axis is the coordinate axis expressing the upward direction seen from the object 60. The X-axis and Z-axis are assumed to be included in the same horizontal plane. Note that the object 60 moves in response to predetermined rules or player operation. As the predetermined rules, for example, a speed of movement or direction of movement etc. are determined.

In a game program, an image of an object in a space captured by a not shown virtual camera is generated by the program and displayed on the display screen 22 of the television set 20 (FIG. 1). The position of the camera becomes the viewpoint.

In cylindrical reflection mapping, a unit length reflection vector V1 is determined for a unit length vector from the viewpoint E1 to a point R1 on the object 60 (below, this vector sometimes being called a viewpoint vector). The image positioned at the point Q1 where an extension of the reflection vector V1 reaches the inner wall of the cylinder 70 is used as the reflection image for the point R1 on the object 60.

If the object 60 moves to the object 60A, when the camera stops and the viewpoint E1 determined by that position does not move, the reflection vector V2 for the point R2 after movement of the point R1 on the object 60A differs from the reflection vector V1 at the point R1. Therefore, the point Q2 on the inner surface of the cylinder 70 which the extension of the reflection vector V2 reaches differs from the point Q1 and the image positioned at the point Q2 differs from the image positioned at the point Q1. The image positioned at the point Q2 is used as the reflection image for the point R2, so the reflection image reflected on the object 60 changes along with movement of the object 60 and is displayed to appear to flow.

On the other hand, assume that the camera tracks the movement of the object 60 and the viewpoint moves to the viewpoint E2. Since the viewpoint moves to E2, the reflection vector V3 for the point R2 is the same as the reflection vector V1. The point Q3 where the extension of the reflection vector V3 reaches the inner wall of the cylinder 70, however, differs from the point Q1, and the image positioned at the point Q3 differs from the image positioned at the point Q1. The image positioned at the point Q3 is used as the reflection image for the point R2. In this case as well, the reflection image reflected on the object 60 changes along with movement of the object 60 and is displayed to appear to flow.

In this way, in cylindrical reflection mapping, not only the direction of the reflection vector, but also the position of the reflection point in the axial direction of the cylinder is used for determination of the reflection image. In this way, even when the viewpoint E1 is tracking movement of the object 60, the reflection image reflected on the object 60 and the reflection image reflected on the object 60A after movement become different images.

As clear from the above, cylindrical reflection mapping uses the image on the inner surface of the cylinder seen from the viewpoint as the reflection image. The reflection vector depends on the position of the viewpoint, the position of the reflection point on the object, and the direction of the surface of the object at the reflection point. The position on the cylinder which the reflection vector reaches depends on the direction of the reflection vector and the position of the reflection point. In the final analysis, in cylindrical reflection mapping, a position in an image linked with the inner wall of the cylinder is determined from the position of the viewpoint, the position of the reflection point on the object, and the direction of the surface of the object at the reflection point.

The object is comprised of a plurality of polygons. When actually determining the reflection image for the object 60, therefore, a reflection image portion reflected on a polygon having a surface reflecting light among the plurality of polygons making up the object is determined. In this case, in the same way as stated for the above point R1, the positions on the inner wall of the cylinder 70 which the extensions of the vector and the reflection vector reach are determined by the position of each vertex of the polygon, the position of the viewpoint, and the direction of the surface of the polygon (direction of normal line of surface). A plurality of positions on the cylinder 70 are determined corresponding to the plurality of vertexes of the polygon.

For example, when the polygon is a triangle, three points on the inner surface of the cylinder 70 are determined. The image of the area defined by these three points in the reflection image linked with the inner surface of the cylinder 70 becomes the reflection image to be reflected on the polygon. The obtained reflection image portion is displayed combined with the image for displaying the polygon.

As clear from the above, to find the reflection image corresponding to a point on the object 60, it is sufficient to determine the point where the extension of the reflection vector at that point reaches the inner surface of the cylinder 70 and determine the reflection image at the point reached. When simply executing the method, since the cylinder 70 is a three-dimensional shape, time is taken for calculation of the point where the extension of the reflection vector reaches the cylinder wall.

In the present embodiment, as a simpler method of cylindrical reflection mapping, instead of finding the point reached, the image position of the reflection image on the two-dimensional reflection image is determined based on the direction of the reflection vector and the position of the polygon to thereby determine the reflection image by a simpler method. At this time, instead of the position of the polygon, the position of the object is used as an approximate value. In the present invention, this simplified method is also considered cylindrical reflection mapping.

Figure 4:
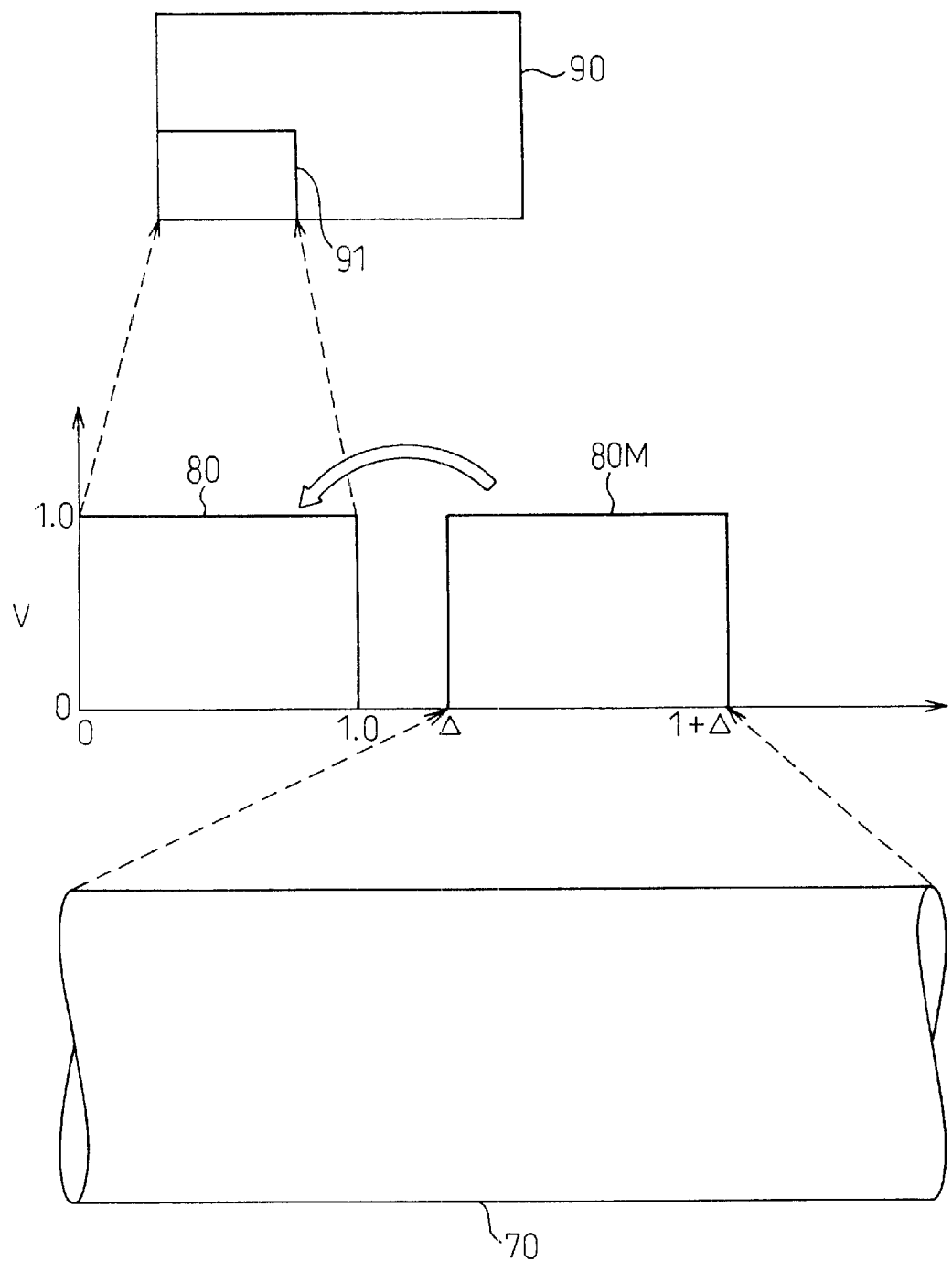
FIG. 4 is a view of the correspondence among the inner surface of the cylinder, the UV coordinate area, and the reflection texture data in the VRAM.

That is, when the object 60 is at a certain position, as shown in FIG. 4, the area 80M in the two-dimensional UV coordinate space (below, this area will sometimes also be called a movable UV area) is linked with the inner surface of the cylinder 70. This area 80M is an area of $\Delta \leq U \leq 1+\Delta$ and $0 \leq V \leq 1$. This $\Delta$ changes in accordance with the position of the object 60 in the direction of movement (in the present case, the Z-coordinate value).

Specifically, instead of judging the position of the point where the reflection vector reaches the inner surface of the cylinder 70, the UV values are determined by the calculation shown later in accordance with the components of the reflection vector and the position of the object 60. In this calculation, the UV values for the reflection vector are set to fall in the movable UV area 80M for all reflection vectors for all polygons making up an object.

The movable UV area 80M is further linked with a reference UV area 80. This area 80 is an area of $0 \leq U \leq 1$ and $0 \leq V \leq 1$. To link the movable UV area 80M with a reference UV area 80, when calculating the U-value in the above calculation, the calculation of $0 \leq U \leq 1$ is performed. That is, in the above calculation, calculation is added to add or subtract an integer to or from the U-value found directly by the calculation so as to make the U-value fall in the range $0 \leq U \leq 1$.

A two-dimensional reflection image is linked with the reference UV area 80. In the present embodiment, the data of a reflection image linked with the reference UV area 80 is stored in the two-dimensional area 91 in the VRAM 90 included in the graphic processor 104. Therefore, the inner surface of the cylinder 70 is linked with the VRAM area 91 through the reference UV area 80.

The VRAM 90 stores a plurality of texture data to be added to the plurality of polygons making up each object. The coordinate values of the VRAM 90 used for reading the texture data are called the texture coordinates. Below, the reflection image data stored in the area 91 in the VRAM 90 will be called the reflection texture data. When reading the reflection texture data, the coordinates in the VRAM area 91 are determined from the U- and V-values and used as the coordinates of the vertex of the reflection texture. Below, however, for simplification, the set of the U- and V-coordinates will sometimes also be called the texture coordinates for the reflection image.

In this way, the inner surface of the cylinder 70 is linked with the reflection texture data stored in the VRAM area 91, but below, for simplification, the explanation will sometimes be made of the inner surface of the cylinder 70 being linked with the reflection texture data stored in the reference UV area 80 considering as if the texture data were stored in the reference UV area 80.

Figure 5A:
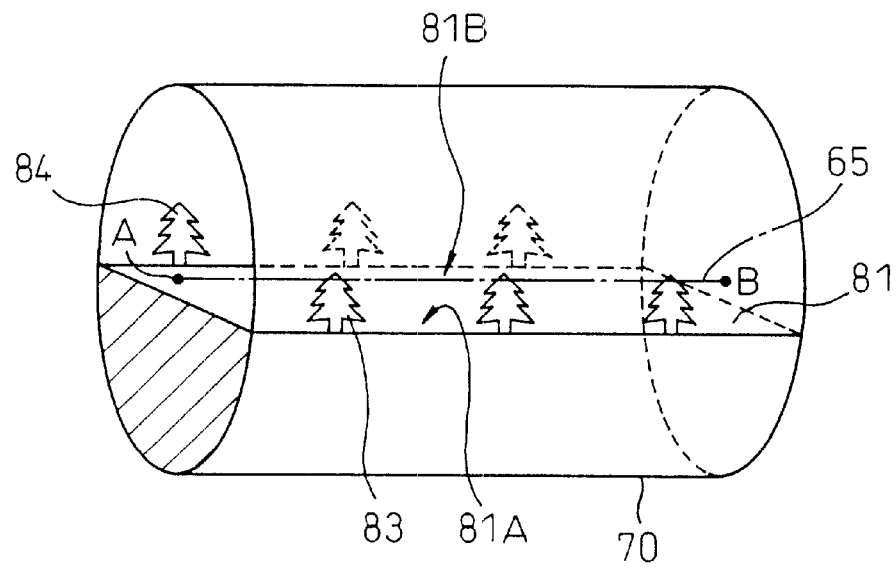
FIGS. 5A and 5B are views of the correspondence between a reflection image able to be linked with the inner surface of the cylinder and the reflection texture data.
Figure 5B:
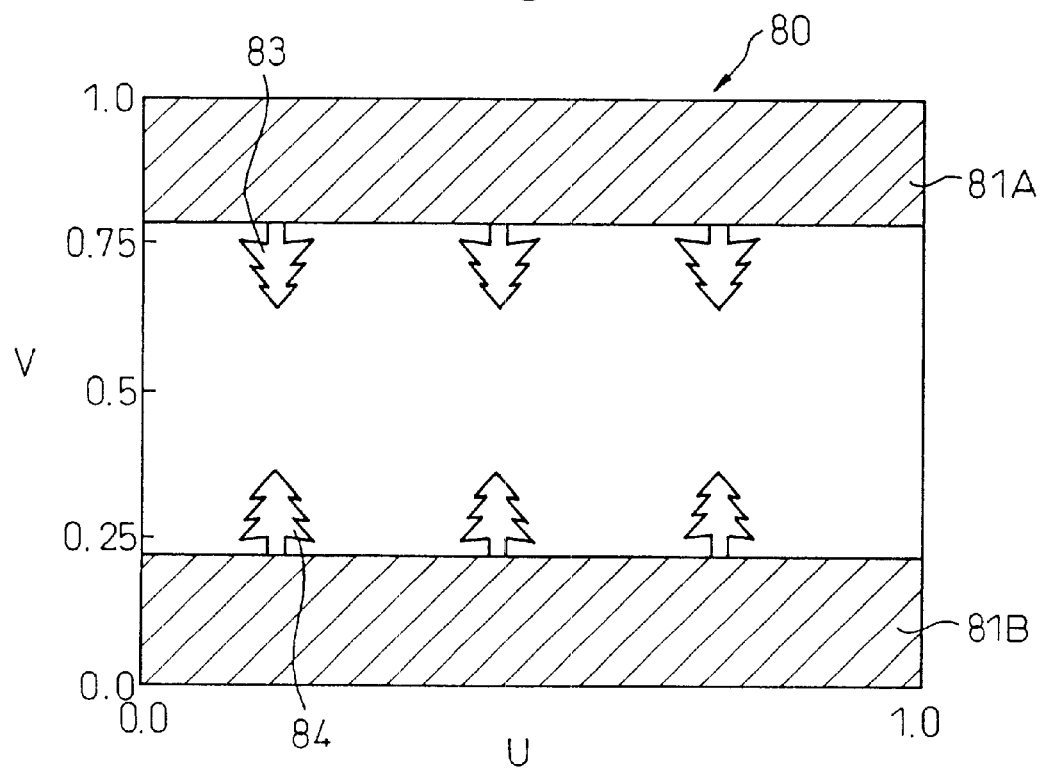

The inner surface of the cylinder 70 and the reference UV area 80 specifically are linked as follows: As shown in FIG. 5A, assume that, at the inner surface of the cylinder 70, there are a plurality of trees 83 positioned at the front side on the ground area 81A at the side of the ground surface 81 in front of the object 60 and that there is linked with this a reflection image having a plurality of trees 84 positioned at the far side on the ground area 81B at the far side of the ground surface 81. The line A–B shows for reference the passing points of the center line 65 of the cylinder 70. As shown in FIG. 5B, in the reference UV area 80, the ground area 81A at the front side is positioned at the top of the reference UV area 80, the front trees 83 are positioned knocked down on the ground area 81A at the front side, the ground area 81 of the far side is positioned at the bottom of the reference UV area 80, and the far trees 84 are positioned above the ground area 81B.

That is, the reference UV area 80 corresponds to the two-dimensional area obtained by cutting open the cylinder 70 at the bottommost portion and spreading open the inner surface. Therefore, the reflection image portion positioned directly above the object 60 linked with the topmost portion of the cylinder 70 is linked with the V=0.5 portion. In the final analysis, the U-axis corresponds to the coordinate axis in the center axis direction defined on the inner surface of the cylinder 70, while the V-axis corresponds to the coordinate axis in the circumferential direction defined on the inner surface of the cylinder 70.

When determining the reflection image for a certain polygon of the object 60, it is found in generally the following way. The UV values of each of the plurality of vertexes of the polygon are determined based on the reflection vector at each of the vertexes and the Z-axis direction coordinate values of the object 60. These UV values are determined to fall in the reference UV area 80. The two-dimensional image data in the VRAM area 91 is determined based on the plurality of UV values found and is used as the reflection image data for the polygon.

Below, an explanation will be given of details of reflection mapping in the embodiment. The game program S200 is generally executed by the routine shown in FIG. 6. First, at the initialization processing S201, the data required for execution of the game program is read from the CD-ROM 40 and stored in a suitable area in the RAM 103. For example, the model data for the plurality of objects used in the game is stored in the area 103c. The texture data to be added to the polygons making up the object is stored in the VRAM 90 (FIG. 4) in the graphic processor 104 at this time.

Further, it is judged for each object if the object has a group of polygons for reflection of a reflection image by this cylindrical reflection mapping (hereinafter called a reflection portion). When a reflection portion is included in an object, the original model data is copied, and the reflection model data is generated and stored in the model data area 103c. The reflection model data is used for later determination of the reflection image data by the cylindrical reflection mapping. Further, the reflection data required for cylindrical reflection mapping is stored in the reflection data area 103d in the RAM 103.

At the game progress processing S202, the progress of the game is controlled. Specifically, it is judged whether to switch the scene in accordance with the player operation. When switching the scene, the data for display of the scene after switching is read from the CD-ROM 40 to the RAM 103. Further, processing is also performed for moving the characters and other objects in response to the operational input.

At the image display processing S300, the images of all of the objects appearing in the scene determined at the game progress processing S202 are generated based on the model data for the objects and written in the not shown frame buffer in the graphic processor 104.

When an object includes a reflection portion, the reflection image of the reflection portion is also generated and written in the frame buffer so as to be superposed on the image representing the original object. In this way, a frame image including the object and reflection image is displayed.

The above processings S202 and S300 are repeated in synchronization with the frame cycle until it is judged that the game has ended (step S203) and a new frame image is displayed with each repetition.

Figure 7A:
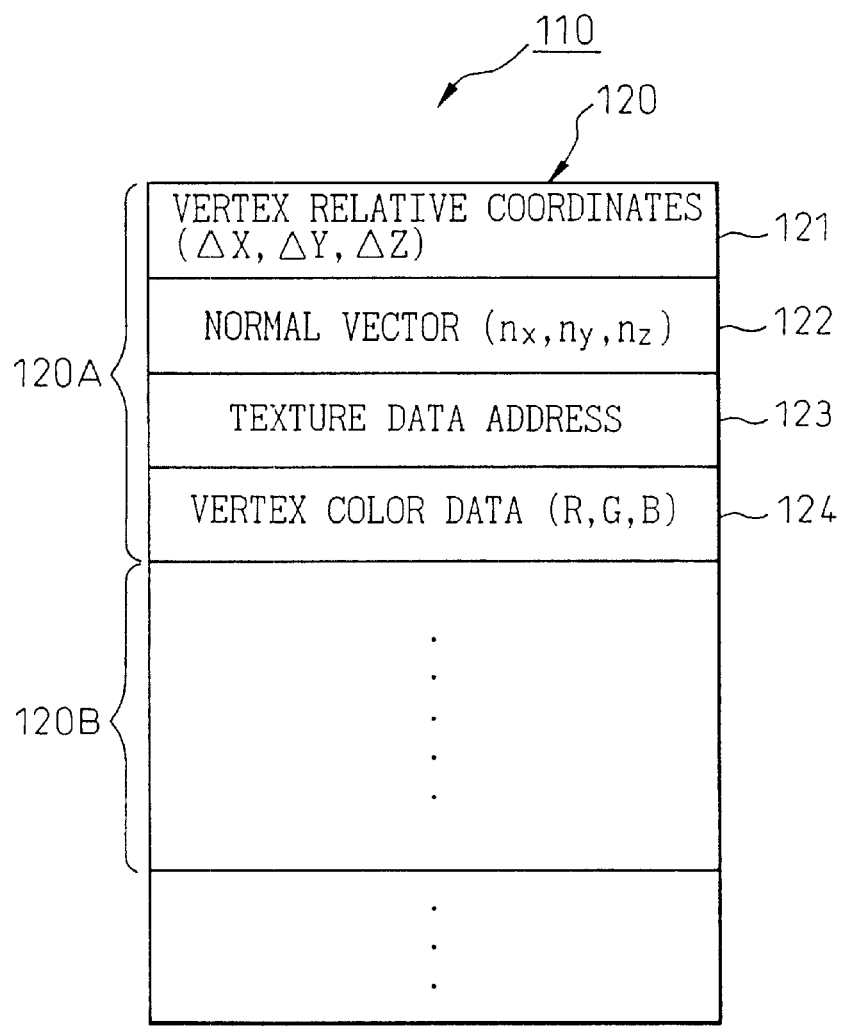
FIGS. 7A and 7B are views of the content of model data.
Figure 7B:
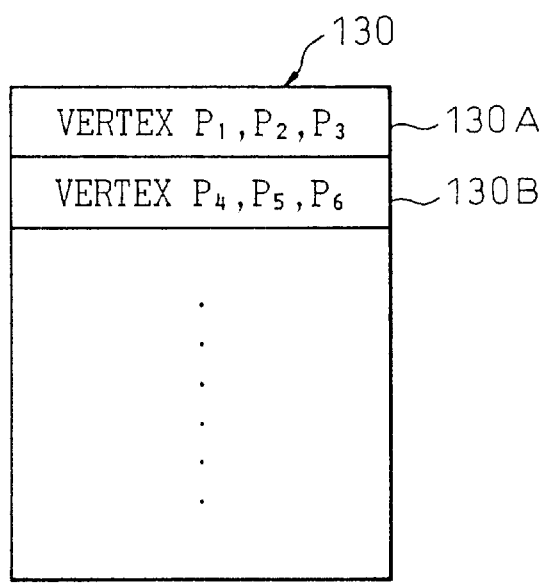

FIGS. 7A and 7B show an example of model data read to the RAM 103 by the initialization processing S201 for one of the objects. The model data 110 includes the vertex data group 120 and the polygon data 130. The model data 110 further includes the position in the three-dimensional space of the model and the motion data, but this data is not shown for simplification.

The vertex data group 120 includes a plurality of vertex data 120A and 120B. The vertex data 120A or 120B includes data relating to each of the plurality of vertexes making up the plurality of polygons included in the object to which the model data 110 corresponds. For example, the relative coordinates ($\Delta X, \Delta Y, \Delta Z$) (121) of the corresponding vertexes, normal vector ($n_x, n_y, n_z$) (122) at the vertexes, the texture coordinates 123, and the vertex color data (R, G, B) (124) are included. The relative coordinates ($\Delta X, \Delta Y, \Delta Z$) (121) of a vertex are relative values of the vertex coordinates with respect to a position (X,Y,Z) in the three-dimensional virtual space of the object to which the vertex belongs.

Here, the texture coordinates 123 are the address of the texture data to be added to the vertex in the texture data stored in the VRAM 90. The vertex color data 124 is texture data designated by texture coordinates, that is, color data used for designating the extent of changing the color of the display pixel corresponding to the vertex from the color of the texture data to be added to the vertex.

The polygon data 130 includes a plurality of vertex designation data 130A and 130B for designating the group of vertexes making up a polygon for each polygon.

Figure 8A:
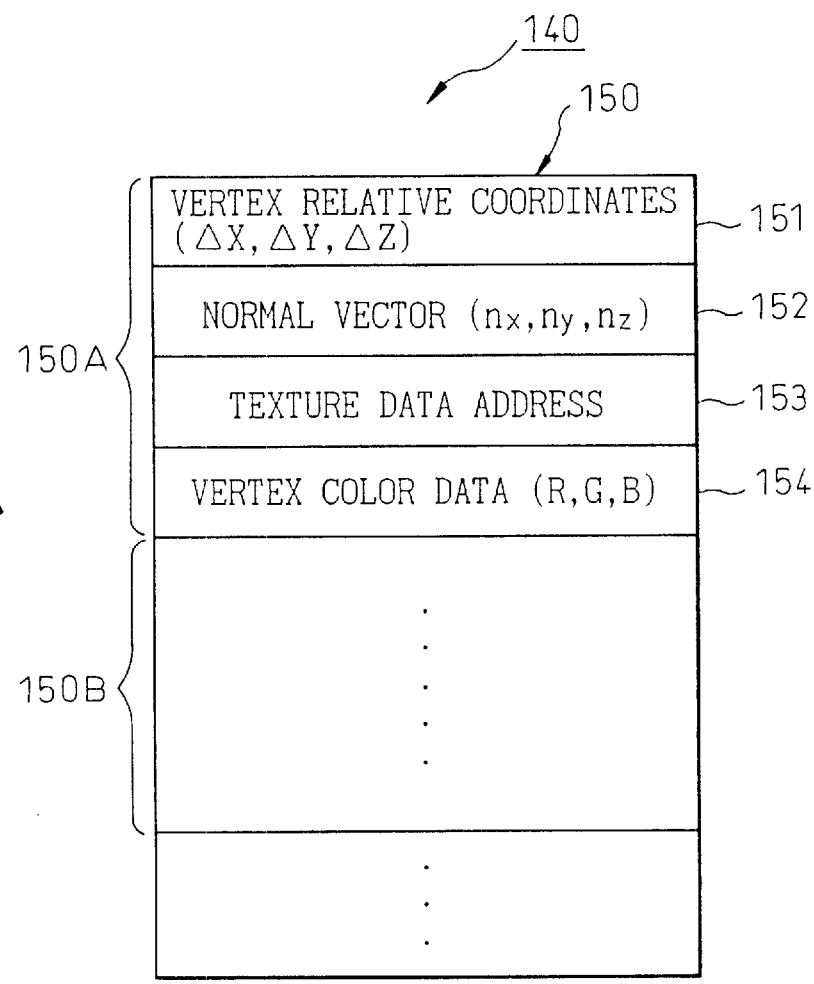
FIGS. 8A and 8B are views of the content of reflection model data.
Figure 8B:
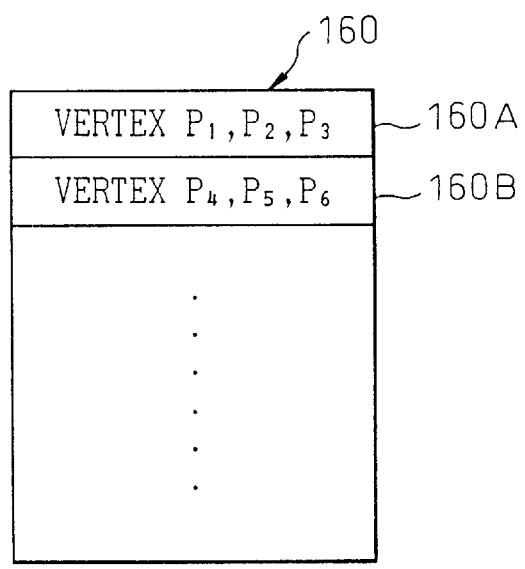

FIGS. 8A and 8B shows an example of reflection model data 140 generated by the initialization processing S201 and stored in the RAM 103. As already stated, the reflection model data 140 is generated by copying the model data for an object when the object includes a reflection portion. In this copying, however, only the portion relating to the plurality of polygons making up a reflection portion is copied in the vertex data group 120 included in the model data 110 for the object.

That is, the reflection model data 140 includes the vertex data group 150 relating to the group of polygons making up the plurality of polygons making up a reflection portion in the vertex data group 120 included in the model data for an object and the polygon data 160 relating to these polygons.

In the above copying, the vertex relative coordinates 151 and normal vector 152 in the vertex data group 150 are copied from the data of the same names in the vertex data group 120 (FIG. 7A). The vertex designation data 160A and 160B in the polygon data 160 are copied from the data of the same names in the polygon data 130 (FIG. 7B). However, the texture coordinates 153 and vertex color data 154 in the vertex data group 150 are not copied from the vertex data group 120 (FIG. 7A).

Note that while not shown, the reflection model data 140 includes data such as the texture data address or texture size. The texture data address is the address in the VRAM 90 storing the two-dimensional reflection texture image for reflection mapping. The texture size is the data size of the reflection texture.

The texture coordinates 153 and the vertex color data 154 are determined by the later explained processing. Unlike the texture coordinates 123 (FIG. 7A) in the model data 110 for an object, the texture coordinates 153 store the UV values found for the corresponding vertexes and are used for reading reflection image data for the polygons. The vertex color data 154 is used for changing the reflection texture data determined for a polygon.

FIG. 9 shows an example of reflection data 170 stored in the RAM 103 by the initialization processing S201. This data is data used for execution of cylindrical reflection mapping.

In the present embodiment, moving the object for cylindrical reflection mapping in a predetermined direction is also called scrolling. This predetermined direction of movement is assumed to be parallel to one of the coordinate axes X, Y, and Z of the virtual three-dimensional space for simplification. The present invention can be applied when the predetermined direction of movement is any direction, however. The coordinate axis parallel to the direction of movement is called the scroll parallel axis. Any of the X-, Y-, or Z-axis may be used as the scroll parallel axis.

One of the other two coordinate axes other than the scroll parallel axis is called the scroll horizontal axis. Here, when the scroll parallel axis is the X-, Y-, or Z-axis, the Z-, X-, or X-axis is defined as the scroll horizontal axis. The coordinate axis neither the scroll parallel axis or the scroll horizontal axis is called the scroll vertical axis. Here, when the scroll parallel axis is the X-, Y-, or Z-axis, the Y-, Z-, or Y-axis defined as the scroll vertical axis. The X-axis never becomes the scroll vertical axis. In the case of FIG. 3, the scroll parallel axis is the Z-axis. Therefore, the scroll horizontal axis is the X-axis, while the scroll vertical axis is the Y-axis.

In FIG. 9, 170A is the scroll parallel axis data $A_P$. The data $A_P$ shows which coordinate axis is the scroll parallel axis. Here, the data $A_P$ is comprised of three flags corresponding to the coordinate axes X, Y, and Z. These flags take the value 1 when the corresponding coordinate axis is the scroll parallel axis and take the value 0 otherwise. In the case of FIG. 3, the scroll parallel axis is the Z-axis, and the flag for the Z-axis in the scroll parallel axis data $A_p$ becomes 1 as shown in FIG. 9.

Reference numeral 170B is the scroll horizontal axis data $A_h$. The data $A_h$ shows which coordinate axis is the scroll horizontal axis. In the same way as the data $A_p$, the data $A_h$ is comprised of three flags corresponding to the coordinate axes X, Y, and Z. These flags take the value 1 when the corresponding coordinate axis is the scroll horizontal axis and take the value 0 otherwise. In the case of FIG. 3, the scroll horizontal axis is the X-axis, and the flag for the X-axis in the scroll horizontal axis data $A_h$ becomes 1 as shown in FIG. 9.

Reference numeral 170C is the scroll vertical axis data $A_v$. The data $A_v$ shows which coordinate axis is the scroll vertical axis. The data $A_v$ is comprised of two flags corresponding to the coordinate axes Y and Z. These flags take the value 1 when the corresponding coordinate axis is the scroll vertical axis and take the value 0 otherwise. In the case of FIG. 3, the scroll vertical axis is the Y-axis, and the flag for the Y-axis in the scroll vertical axis data $A_v$ becomes 1 as shown in FIG. 9.

Reference numeral 170D is the scroll scale value $S_c$. The data $S_c$ is used for changing the amount of change of the reflection image when the object moves as explained later. For example, when the environment to generate the reflection image is far away, the scroll scale value SC is made small and the amount of change of the reflection image becomes small.

Reference numeral 170E is infinitely far color data $C_f$ and shows the image data used as the reflection image for a reflection vector comprised of only the horizontal component in the direction of movement of the object.

Reference numeral 170F is the mapping texture standard color data $C_r$. As explained later, the data $C_r$ is the standard value of the vertex color data 154 (FIG. 8) of the vertex of a polygon. The color of the reflection image for any vertex is changed in accordance with the difference between the vertex color data 154 for that vertex and the mapping texture standard color data $C_r$.

Figure 6:
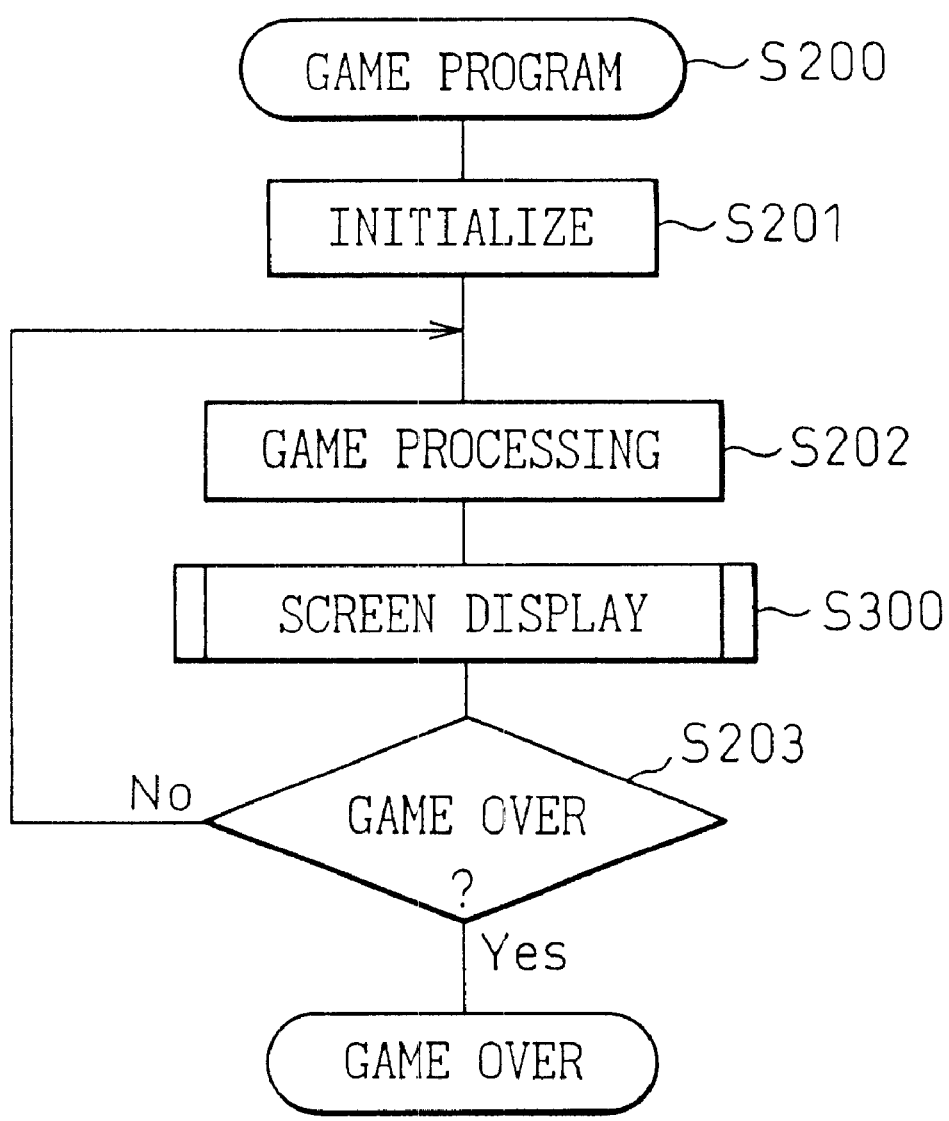
FIG. 6 is a flowchart of a game program.
Figure 10:
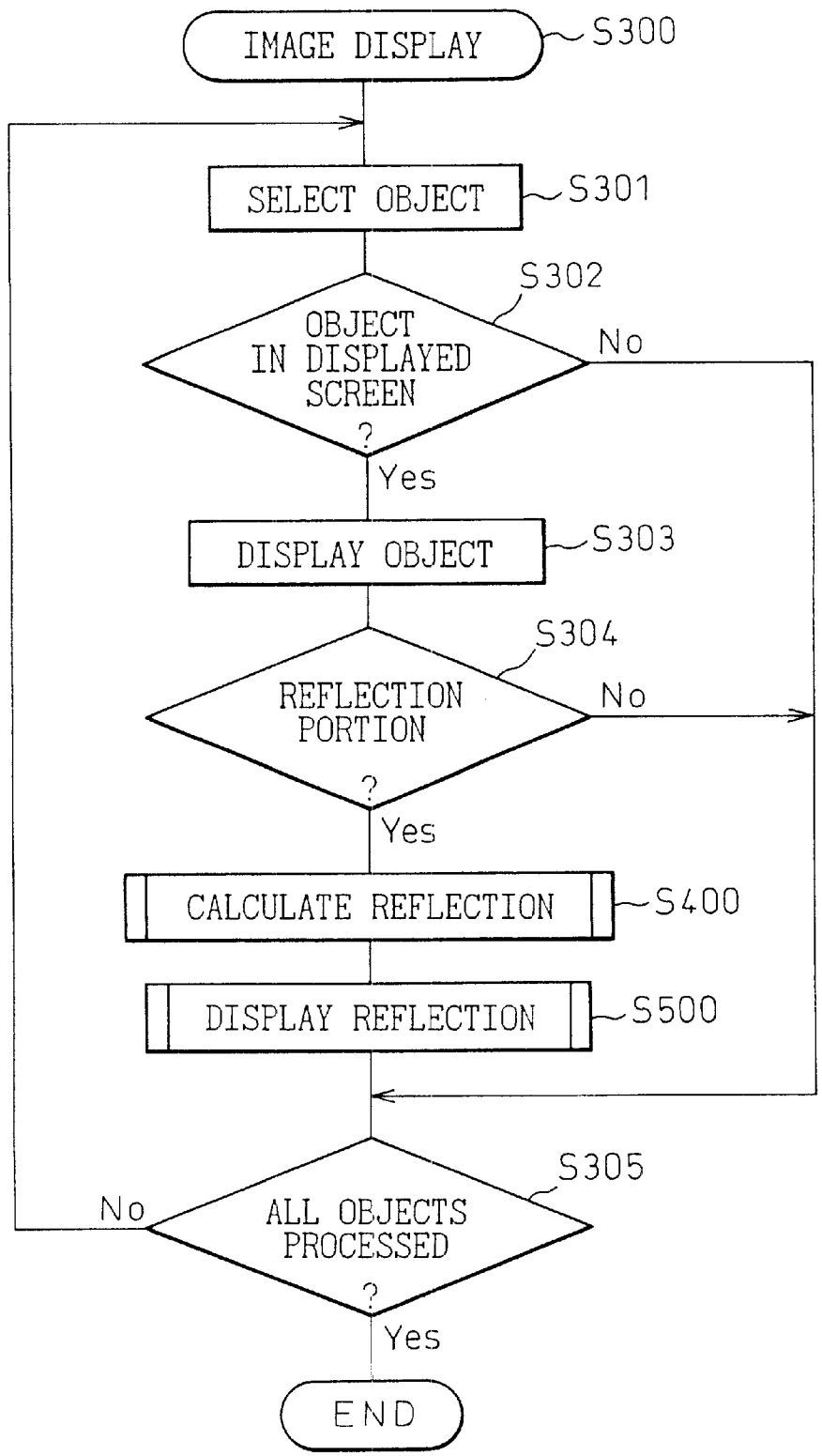
FIG. 10 is a flowchart of image display processing.

The image display processing S300 shown in FIG. 6 is executed in accordance with FIG. 10. First, one of the objects to be displayed is selected (step S301). The coordinates of the object in the three-dimensional virtual space are converted to coordinates of a viewpoint coordinate system using the model data for the object, as is itself well known. Further, perspective transformation is applied for projecting the object on the display screen.

Based on the results of the perspective transformation, it is judged if the object is positioned in the display screen or is positioned outside the display screen and not displayed due to clipping (step S302). When it is judged that the object is not positioned in the display screen, the following processing is not executed.

When it is judged that the object is positioned in the display screen, processing for displaying the object is executed (step S303). That is, an object image is generated using the model data for the object and is stored in a not shown frame buffer in the graphic processor 104.

At the time of generation of the object image, the texture data to be added to the polygons comprising the object is read from the VRAM 90 (FIG. 4) based on the texture coordinates 123 (FIG. 7A) and is added to the plurality of display pixels falling in the image areas in the display screen expressing the polygons.

At this time, the vertex color data 124 (FIG. 7A) is used as follows. When the values of all the components of the vertex color data 124 for all of the plurality of vertexes making up the polygons are equal to the standard value, for example, "128", the color of the texture data is not changed.

When the value of any of the components of the vertex color data 124 for any of the vertexes is not equal to the standard value "128", the color of that component of the texture data to be added to the vertex is changed in accordance with the value of that component of the vertex color data 124. When the color of the texture data for any vertex is changed, the entire texture data to be added to the polygon including that vertex is changed.

For example, when the R component of the vertex color data 124 of a vertex is larger than the standard value "128", the color of the texture data added to the vertex is changed to a more reddish color. Along with the change of the vertex, the R component of the image data of another display pixel belonging to the same polygon is changed by exactly an amount corresponding to the distance from the pixel representing the vertex to that other pixel.

After the object display step S303, it is judged if there is a reflection portion in the object (step S304). As already explained, the reflection portion is a polygon group for reflection of the reflection image by this cylindrical reflection mapping. When there is a reflection portion in the object, the reflection model data 140 (FIGS. 8A and 8B) for that reflection portion is generated by the initialization processing S201 (FIG. 6). At the above judgement step S304, it is judged if the reflection model data has finished being generated.

When the reflection model data has finished being generated, the reflection calculation processing S400 is executed. Here, the reflection image for each of the plurality of polygons making up the reflection portion is determined by the method explained later in detail. At the reflection display processing S500, as explained later in detail, the reflection image determined is displayed combined with the object image generated at step S303. Next, it is judged if all of the objects have been processed (step S305). The above processing is repeated until all of the objects have been processed.

Figure 11:
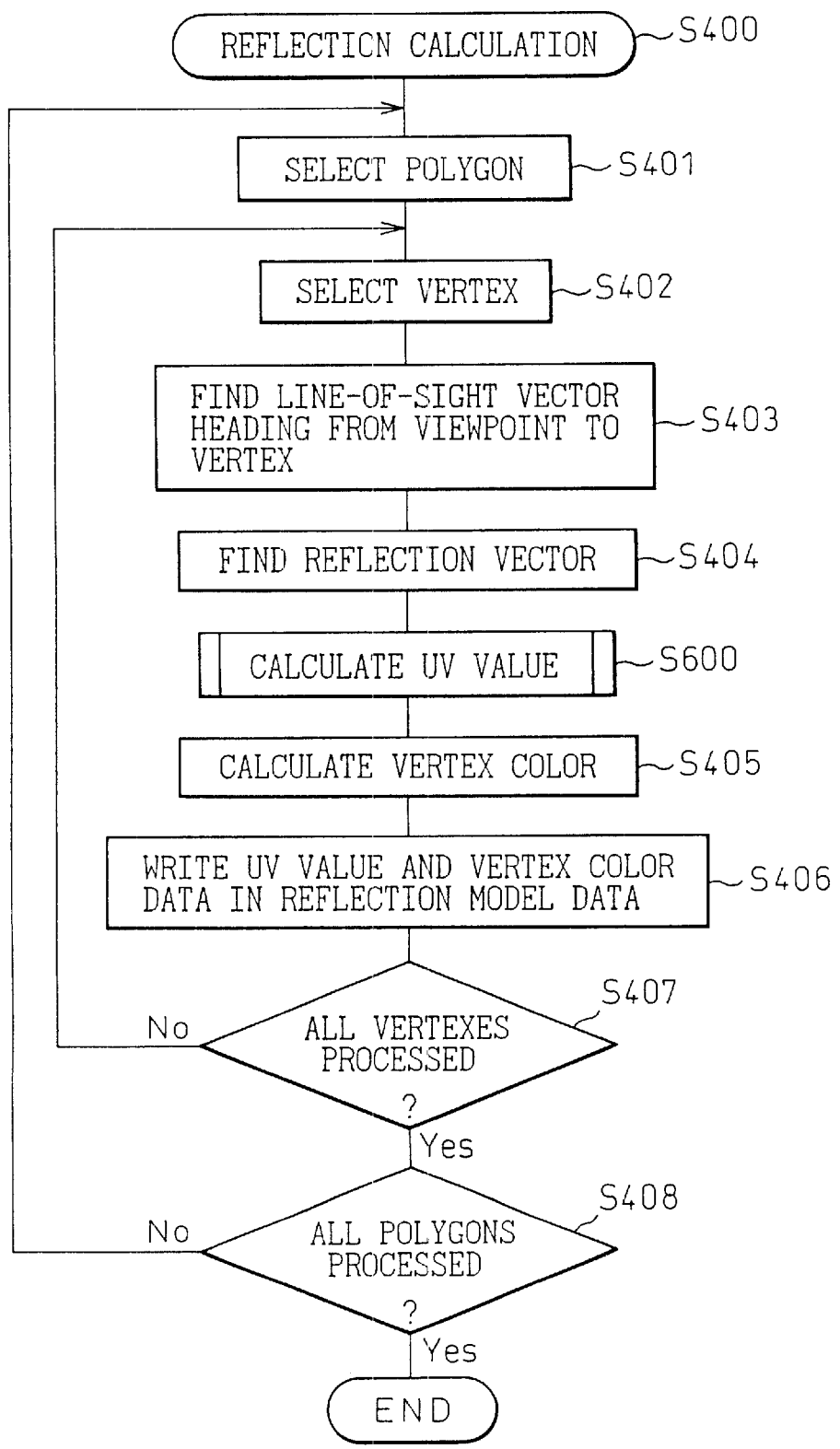
FIG. 11 is a flowchart of reflection calculation processing.

The reflection calculation processing S400 is executed in accordance with FIG. 11. Here, the reflection image for each of the plurality of polygons making up the reflection portion is determined. First, one of these plurality of polygons is selected (step S401). Next, one of the plurality of vertexes of the polygon is selected (step S402). A unit length viewpoint vector heading from the viewpoint in the three-dimensional virtual space to the vertex is then found (step S403).

Further, the unit length reflection vector at that vertex for that viewpoint vector is found (step S404). The reflection vector is found using the normal vector at that vertex. The reflection vector is a vector having a direction of the advance of the reflection of light when light reaches the vertex from the direction of the normal vector and having an end point positioned at that vertex. The normal vector, as shown by 152 at FIG. 8A, is included in the vertex data group 150 in the reflection model data 140. When the normal vector 152 is not included in the reflection model data 140, it can be found by using the relative coordinates of the plurality of vertexes the polygon being processed.

A plurality of normal vectors 152 for each vertex can also be set in accordance with the direction of the surface of each of the plurality of adjoining polygons at that vertex corresponding to each of the polygons. Alternatively, just one normal vector 152 can also be set in common for the plurality of adjoining polygons.

Based on the reflection vector found and the position along the direction of movement of the object including the reflection portion (in the present case, the Z-coordinate), the UV value calculation processing S600 is executed and the UV coordinate values corresponding to that vertex are found by the later explained method.

Further, the vertex color for that vertex is calculated by the later explained method (step S405). The UV values and vertex color found are written in the reflection model data (step S406).

Next, it is judged if all of the vertexes have been processed (step S407). The above processing is repeated until it is judged that all vertexes have been similarly processed (step S408). Then, the reflection calculation processing S400 ends.

Figure 12:
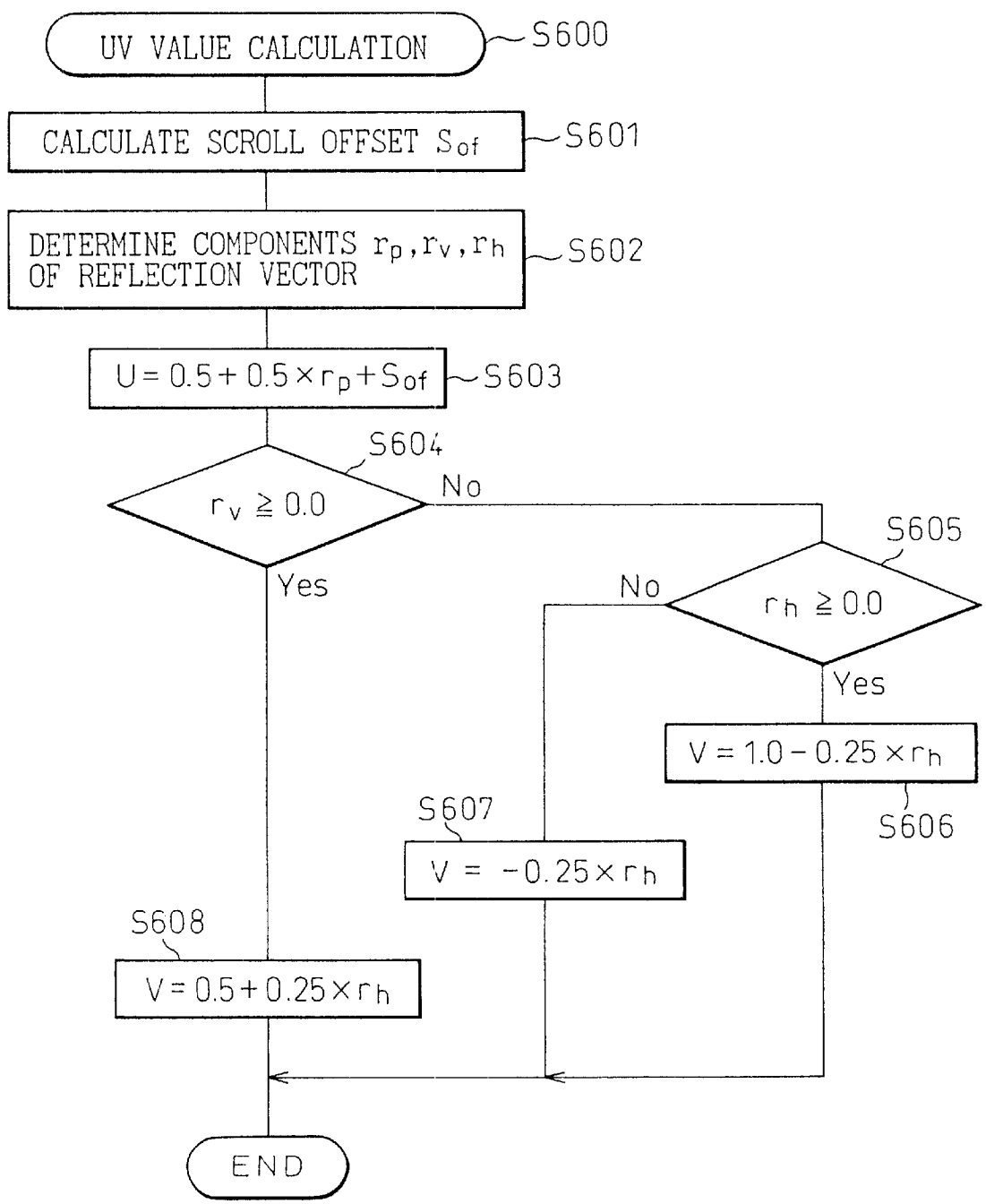
FIG. 12 is a flowchart of UV value calculation processing.

The UV value calculation processing S600 executed at the reflection calculation processing S400 (FIG. 11) is executed in accordance with FIG. 12. First, the scroll offset $S_{of}$ is calculated (step S601). The scroll offset $S_{of}$ is the product of the position along the direction of movement of the object and the scroll scale value $S_c$ (170D) in the reflection data 170 (FIG. 9). In the case of the object 60 shown in FIG. 3, the direction of movement of the object is parallel to the Z-axis, while the position in the direction of movement of the object is given by the Z-coordinate of the object 60.

The direction of movement and the speed of movement of the object in the three-dimensional virtual space are given in advance as motion data separate from the model data. When executing the object display processing S303 (FIG. 10), the new position of each object is determined based on the motion data. Therefore, the Z-coordinate value of the object 60 is also already determined at that time. As will be explained later, the scroll offset $S_{of}$ is used for changing the reflection image portion in accordance with the position of the object.

Next, the three components of the reflection vector are determined (step S602). Specifically, the component $r_p$ relating to the scroll parallel axis (in the example of FIG. 3, the Z-axis component $r_z$), the component $r_h$ relating to the scroll horizontal axis (in the example of FIG. 3, the X-axis component $r_x$), and the component $r_v$ relating to the scroll vertical axis rv (in the example of FIG. 3, the Y-axis component $r_y$) are determined. These components may take values of from −1 to 1.

The U-coordinate value corresponding to the vertex being processed is determined (step S603). Specifically, the U-value is determined by the following equation 1. Note that below, equation 1 a comprising equation 1 minus the scroll offset $S_{of}$ is also shown. Equation 1a helps the understanding of the basic aspects of the cylindrical reflection mapping in the present embodiment. As shown in FIG. 3, when the object moves parallel to the Z-axis, $r_p$ becomes the Z-axis component $r_z$ of the reflection vector and equations 1 and 1a become the following equations 1c and 1c.

$$U=0.5+0.5 \times r_p + S_{of} \tag{1}$$

$$U=0.5+0.5 \times r_p \tag{1a}$$

$$U=0.5+0.5 \times r_z + S_{of} \tag{1b}$$

$$U=0.5+0.5 \times r_z \tag{1c}$$

First, consider equation 1a for understanding the method of determination of the UV coordinate values for cylindrical reflection mapping in the present embodiment. The scroll parallel axis component $r_p$ of the reflection vector generally takes a value from −1 to 1. When $r_p$ is −1, U is 0. When $r_p$ is 1, U is 1. When $r_p$ is 0, U becomes 0.5. When $r_p$ changes from −1 to 1, U changes from 0 to 1. Therefore, equation 1a determines the U-value in the reference UV area 80 of FIG. 4 corresponding to $r_p$.

As shown in FIG. 3, when the object 60 moves parallel to the Z-axis and in the −Z axis direction, according to equation 1c, when the Z-axis component of the reflection vector is 0, is, when the reflection vector is perpendicular to the axis of the cylinder, the U-value becomes 0.5. When the reflection vector is completely oriented in the Z-axis direction and the Z-axis component is 1, that is, when the reflection vector becomes the opposite direction to the direction of movement of the object 60, the U-value becomes 1. When the reflection vector is completely oriented in the −Z-axis direction and the Z-axis component is −1, that is, when the reflection vector is the same direction as the direction of movement of the object 60, the U-value becomes −1.

The V-value corresponding to the vertex in processing is determined in the following way. First, it is judged if the scroll vertical axis component $r_v$ of the reflection vector is 0 or more (step S604). When the scroll vertical axis component $r_v$ is 0 or more, the V-value is determined by the following equation 2 (step S608). As shown in FIG. 3, when the object moves parallel to the Z-axis, $r_h$ becomes the X-axis component $r_x$ of the reflection vector, while equation 2 becomes equation 2a. Since $r_h$ is 0 to 1, from equation 2, the V-value changes from 0.5 to 0.75.

$$V=0.5+0.25 \times r_h \tag{2}$$

$$V=0.5+0.25 \times r_x \tag{2a}$$

When the scroll vertical axis component $r_v$ is smaller than 0, it is judged if the scroll horizontal axis component $r_h$ is 0 or more (step S605). When the scroll horizontal axis component $r_h$ is 0 or more, the V-value is determined by the following equation 3 (step S606). When the object moves parallel to the Z-axis as shown in FIG. 3, equation 3 becomes 3a. Since $r_h$ is 0 to 1, from equation 3, the V-value changes from 1.0 to 0.75.

$$V=1.0-0.25 \times r_h \tag{3}$$

$$V=1.0-0.25 \times r_x \tag{3a}$$

When it is judged by judgement step S605 that the scroll horizontal axis component $r_h$ is smaller than 0, the V-value is determined by the following equation 4 (step S607). When the object moves parallel to the Z-axis as shown in FIG. 3, equation 4 becomes 4a. Since $r_h$ is 0 to 1, from equation 4, the V-value changes from 0.25 to 1.0.

$$V=-0.25 \times r_h \tag{4}$$

$$V=-0.25 \times r_x \tag{4a}$$

Specific examples of the U-value and V-value become as follows for the case where the object 60 moves parallel to the Z-axis as shown in FIG. 3. From equation 1a, when the reflection vector is completely oriented in the Y-axis direction, the reflection vector is (0,1,0). At this time, from equation 2, V=0.5. Therefore, in FIG. 5B, V=0.5 corresponds to the environment directly above the object.

When the reflection vector is completely oriented in the X-axis direction, the reflection vector is (1,0,0). At this time, from equation 1, U=0.5, while from equation 3, V=0.75. When changing from the state where the reflection vector is completely oriented in the X-axis direction to a direction substantially heading in the −Y-axis direction, the reflection vector is substantially (0,−1,0). From equation 1, U=0.5, while from equation 3, V becomes substantially 1.0.

Therefore, the area where the V-value at the reference UV area 80 is 0.75 to 1.0 corresponds to the area 81A (FIGS. 5A and 5B) close to the ground at the front side in the inner surface of the cylinder 70. The area where the V-value at the reference UV area 80 is 0.75 to 0.5 corresponds to the environment from the area 81A close the ground at the front side in the inner surface of the cylinder 70 to directly above the object.

When the reflection vector is completely oriented in the −X-axis direction, the reflection vector is (−1,0,0). At this time, from equation 1, U=0.5. From equation 2, V=0.25. When changing from the state where the reflection vector is completely oriented in the −X-axis direction to substantially the −Y-axis direction, the reflection vector is substantially (0,−1,0), U=0.5 from equation 1, and V becomes substantially 0 from equation 4.

Therefore, the area where the V-value at the reference UV area 80 is 0 to 0.25 corresponds to the area 81B close to the ground at the far side in the inner surface of the cylinder 70. The area where the V-value at the reference UV area 80 is 0.25 to 0.5 corresponds to the environment from the area 81B close the ground at the far side in the inner surface of the cylinder 70 to directly above the object.

The relationship between the reflection vector and the UV coordinates changes tremendously in this way according to whether the X-component is 0 or more or less than 0 in the case where the Y-component of the reflection vector is −1. This shows that, as explained with reference to FIGS. 5A and 5B, the reference UV area 80 corresponds to the two-dimensional area obtained when cutting open the cylinder 70 at its bottommost location.

When ignoring the movement of the object, the reflection vector and UV coordinate values are linked by equation 1a and equations 2 to 4 in the above way. To consider movement of the object, it is necessary to use equation 1 or equation 1c instead of equation 1a or 1c.

In equation 1, since the scroll offset $S_{of}$ is further added to the U-value determined by equation 1a, equation 1 gives the U-value belonging to the movable UV area 80M comprised of the reference UV area 80 of FIG. 4 shifted by exactly the value of $S_{of}$. In FIG. 4, A becomes equal to the value of the scroll offset $S_{of}$.

In the present embodiment, the U-value found from equation 1 is calculated using 1 as the divisor. That is, when the U-value calculated from equation 1 is not in the range of 0 to 1, the integer n is added or subtracted to or from the calculated U-value to calculate a U-value with a value falling in the range of 0 to 1. In this way, the movable UV area 80M is linked with the reference UV area 80.

For example, assume the range of the movable UV area 80M is $\Delta \leq U \leq 1+\Delta$ as illustrated and further that $n<\Delta \leq n+1$ (where, n is an integer larger than 1). The range of the above U is an area straddling n+1. Different processing is performed depending on which of the following two ranges U falls in. The U belonging to $\Delta \leq U \leq n+1$ is reduced by exactly n to fall into the range $\Delta-n \leq U \leq 1$. This U falls in the reference UV area 80.

On the other hand, U belonging to $n+1 \leq U \leq \Delta+1$ is reduced by exactly n+1 so as to fall in the range $0 \leq U \leq \Delta-n$. The U also falls in the reference UV area 80. In this way, the U belonging to the movable UV area 80 corresponds to either of two areas in the reference UV area 80. Note that the above is also true in the case where n is an integer smaller than −1.

Even if the position of the object changes in this way, the reflection image reflected on the object is generated by using the reflection texture data corresponding to the reference UV area 80. This means that the same reflection image portion is repeatedly reflected on the object along with movement of the object. In the game, however, usually this is not too much of a problem for the game player. In the present embodiment, the amount of reflection texture images to be prepared in advance using this is reduced.

In the basic method of cylindrical reflection mapping shown in FIG. 3, the position in the direction of movement on the inner surface of the cylinder 70 which the extension of the reflection vector reaches changes in accordance with the direction of the reflection vector. In equation 1, however, when determining the U-value, use is made of only the component $r_p$ parallel to the direction of movement rather than all the components determining the direction of the reflection vector. Therefore, the U-value is obtained by calculating the value approximately simulating the position in the direction of movement of the point on the inner surface of the cylinder which the reflection vector reaches. Due to this, the calculation of the U-value is simplified.

In the basic method of cylindrical reflection mapping shown in FIG. 3, the position in the direction of movement on the inner surface of the cylinder 70 which the extension of the reflection vector reaches changes in accordance with the position of the vertex of the polygon in the direction of movement. In equation 1, however, when determining the U-value, the position in the direction of movement of the object is used. By using the position in the direction of movement of the object in common for all vertexes for all polygons, the calculation of the U-values is simplified. When determining the scroll offset $S_{of}$ in equation 1, instead of the position in the direction of movement of the object, it is of course possible to use the position in the direction of movement of a polygon.

In the basic method of cylindrical reflection mapping shown in FIG. 3, the position in the direction of movement on the inner surface of the cylinder which the reflection vector reaches changes by exactly the same amount in accordance with the change in the position in the direction of movement of the object, while the speed of the change of the reflection image of the environment is inversely proportional to the distance from the object to the environment. In equation 1, however, the product of the position in the direction of movement of the object and the scroll scale value $S_c$ is added to the U-value as the scroll offset $S_{of}$. In equation 1, the value of the scroll scale value $S_c$ can be made to change in accordance with the distance from the object to the environment.

Therefore, the feature of cylindrical reflection mapping of the position on the inner surface of a cylinder which an extension of a reflection vector reaches changes due to the position in the direction of movement of the object (more accurately, the position in the direction of movement of the vertex of the polygon) is, no differently, realized, though approximately. Further, by using the scroll scale value $S_c$, the speed of change of the environment reflection image on the object is changed approximately in accordance with the distance from the object to the environment.

In the basic method of cylindrical reflection mapping shown in FIG. 3, the position in the circumferential direction on the inner surface of the cylinder 70 which the extension of the reflection vector reaches changes due to the components of the reflection vector in the plane vertical to the direction of movement of the object. In the present embodiment, however, the calculation equation of the V-value from the value of the scroll vertical axis component $r_v$ among the components in the plane vertical to the direction of movement of the object is changed to any of equations 2 to 4. In these calculation equations, the V-value is determined by only the scroll horizontal axis component $r_h$.

In equations 2 to 4, instead of finding the coordinates in the circumferential direction of the point for a position which the extension of the reflection vector reaches, the V-value is found by simple calculation as a coordinate value corresponding to the position in the circumferential direction.

As will be understood from the above, the calculation of the UV values by equations 1 to 4 are simplified calculations considered for realization of cylindrical reflection mapping. Since the calculation is simple, they are effective. However, the present invention is not limited to calculation of the UV values by these calculation equations. Further, it is also possible to use coordinate axes other than the U- and V-axes.

The cylindrical reflection mapping shown in FIG. 3 determines the reflection image reflected at a polygon by the reflection image portion linked with the position which the extension of the reflection vector by that polygon reaches in the reflection image linked with the inner surface of the cylinder. However it is not necessary to use the reflection texture data making the reflection of the environment faithfully correspond to the inner surface of the cylinder and further it is not necessary to find the position where the reflection vector reaches the inner surface of the cylinder.

That is, as shown in the present embodiment, by using the reflection texture data giving an image changing in accordance with the axial direction of the cylinder in the same way as the reflection texture data and using the method of determining reflection image portions differing in accordance with the position in the direction of movement of the reflection point and the direction of the reflection vector, it is possible to determine the reflection image portion having similar characteristics as the basic method of cylindrical reflection mapping shown in FIG. 3. In the present invention, this reflection mapping is also called cylindrical reflection mapping.

Various methods of generating reflection texture data to be stored in the VRAM area 91 (FIG. 4) may be considered. Simply speaking, it is sufficient to generate reflection texture data approximately representing the trees 83, 84 and the ground areas 81A, 81B shown in FIG. 5B. To generate more accurate texture data, it is sufficient to arrange a plurality of objects making up the environment in the three-dimensional virtual space, map the image when viewing the environment from the center position of the cylinder 70 on the inner surface of the cylinder 70, and cut open the image of the inner surface of the cylinder obtained in the direction of the center axis of the cylinder at the bottommost point of the cylinder to obtain a two-dimensional image.

Note that in FIG. 3, the object 60 is assumed to be moving parallel to the −Z-axis direction, so the movable UV area 80M moves in the −U-axis direction, but in the figure, for simplification, the movable UV area 80M is displayed to appear to move in the +U-axis direction.

By the above, in the UV value calculation processing S600, the UV coordinate values designating the reflection image data to be used for a vertex being processed are calculated. The UV values found are stored in the texture coordinates 153 for the vertex being processed in the reflection model data 140 (FIGS. 8A and 8B). In this way, the set of texture coordinates found for a plurality of vertexes making up a polygon is used to specify the reflection texture data to be used for that polygon in the reflection image data in the VRAM area 91 (FIG. 4).

The vertex color calculation processing S405 executed at the reflection calculation processing S400 (FIG. 11) is executed in the following way. In the processing S405, the vertex color data 154 (FIG. 4) is found for each of the plurality of vertexes making up the polygon being processed by the reflection calculation processing S400 in the plurality of polygons included in the reflection portion.

As already explained, the reflection texture data for a polygon making up a reflection portion is designated by the set of UV values corresponding to the plurality of vertexes of the polygon. Further, in the present embodiment, vertex color calculation processing is performed for solving the following two problems.

The first problem is how to reflect the effect of a reflection image on a polygon image even when the reflection vector is completely parallel to the direction of movement of the object. That is, when a reflection vector at a vertex of a polygon being processed only includes components parallel to the direction of movement of the object, the U-value determined by equation 1a (that is, the portion of the U-value determined from equation 1 corresponding to the reflection vector minus the scroll offset $S_{of}$) is generated by being fixed to 0 or 1. That is, when the polygon is comprised of a plane vertical to the direction of movement, the portion of the U-value for all of the vertexes of a polygon minus the scroll offset $S_{of}$ becomes 0 or 1 for all vertexes and it is not possible to determine the two-dimensional reflection image portion to be displayed on the polygon.

To solve this problem, the method is adopted of dealing with a polygon generating a reflection vector comprised of only components parallel to the direction of movement of the object by superposing a predetermined color on the image of the polygon as a reflection image. The predetermined color is designated by the infinitely far color data $C_f$ (170E) included in the reflection data 170 (FIG. 9).

The reflection image from the direction parallel to the direction of movement is a reflection image from the environment at an infinitely far position, so it is not necessary to display the reflection image reflecting the structure of the environment. It is considered sufficient to display a color showing the existence of reflection superposed on the original polygon. The above method of using the infinitely far color data $C_f$ is based on this idea. Since no complicated processing is introduced, a reflection image for the reflection vector of only the component parallel to the direction of movement is generated. However, when not desiring to change the image of the polygon, the predetermined color may be set to black as in the present embodiment.

Specifically, in the vertex color calculation processing S405, the following processing is executed for the vertex processed by the UV value calculation processing S600 in the plurality of vertexes making up a polygon being processed at the reflection calculation processing S400. When the scroll parallel axis component $r_p$, in the present example, the Z-axis component $r_z$, in the components of the reflection vector at that vertex, is 0 or 1, the infinitely far color data $C_f$ (170E) is written in the vertex color data 154 (FIG. 8A) for that vertex.

The second problem is how to change the clarity of the reflection image in accordance with the distance from the polygon to the environment. This problem is particularly serious when the component of the reflection vector at the vertex of the polygon parallel to the direction of movement of the object is large. In this case, the reflection image data for the vertex expresses the reflection from a certain environment at a far position. If the reflection image for such a reflection vector and the reflection image for a not such reflection vector are displayed by the same clarity or the same brightness, the obtained reflection image ends up lacking realism.

In the present embodiment, to solve the second problem, the reflection image data determined by the UV values calculated by the UV value calculation processing S600 for each vertex is changed in accordance with the magnitude of the components parallel to the direction of movement of the reflection vector for that vertex.

Figure 13A:
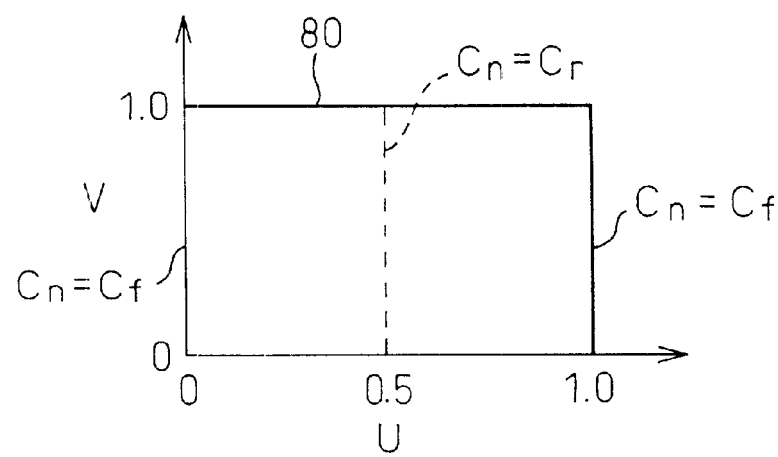
FIGS. 13A, 13B, and 13C are views for explaining a method of determination of vertex color data corresponding to a reflection image.

That is, as shown in FIG. 13A, when the U-value determined from equation 1a for a certain vertex (value of portion of U-value determined from equation 1 minus scroll offset $S_{of}$) is 0 or 1, as explained above, the vertex color data of the vertex (hereinafter indicated as $C_n$) is changed to the infinitely far color data $C_f$. Note that in this figure, as the U-value, the value determined from equation 1a (that is, the value minus the scroll offset $S_{of}$) is shown. The same is true for FIGS. 13B and 13C.

Figure 13B:
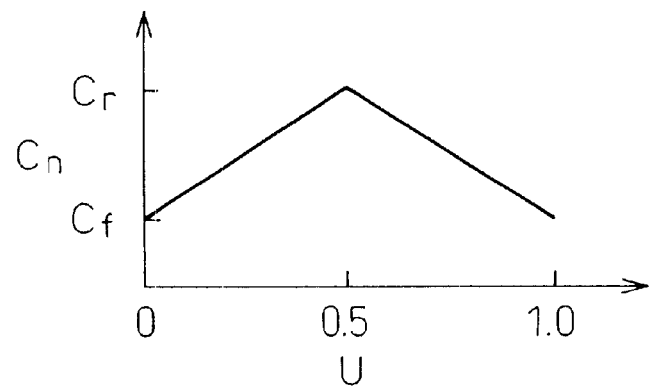

The vertex color data $C_n$ for a vertex with a U-value not 0 or 1, as illustrated in FIG. 13B, is determined so as to be positioned between the mapping texture standard color data $C_r$ and the infinitely far color data $C_f$ in the reflection data 170 (FIG. 9).

At this time, the vertex color data $C_n$ for the vertex having a U-value determined from equation 1a of 0.5 is set to be equal to the mapping texture standard color data $C_r$. Therefore, the reflection image for the vertex corresponding to that value is not changed.

However, the vertex color data $C_n$ of the vertexes are determined so that the vertex color data of another vertex changes smoothly according to the U-value determined by equation 1a of each vertex and the U-value determined from equation 1a approaches the infinitely far color data $C_f$ as it approaches 0 or 1. As a result, in FIG. 13B, the vertex color data $C_n$ of each vertex is determined so as to be proportional to the U-value determined from equation 1a of that vertex.

Figure 13C:
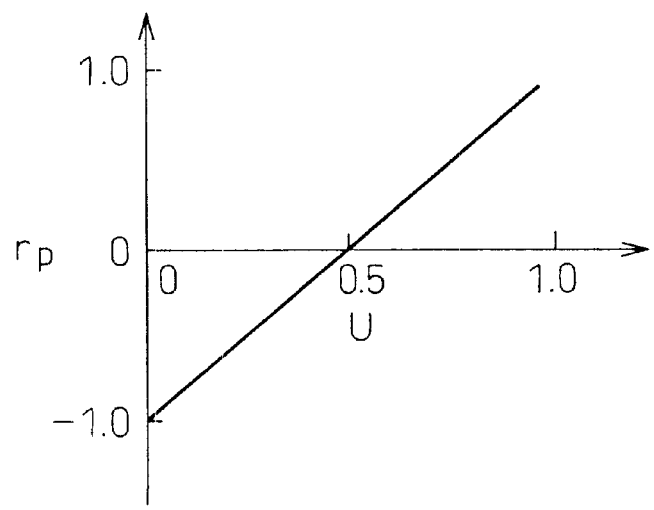

The U-value determined from equation 1a, as clear from equation 1a and further as shown in FIG. 13C, is dependent on the scroll parallel axis component $r_p$ (in the example of FIG. 3, the Z-axis component $r_z$). Therefore, the vertex color data $C_n$ for each vertex is determined from equation 5 using the absolute value of the scroll parallel axis component $r_p$ of the reflection vector. Of course, it is also possible to calculate the vertex color from another calculation equation.

$$C_n = C_r + (C_f - C_r) \times |r_p| \quad (5)$$

In this way, the vertex color data $C_n$ is determined by equation 5 for all vertexes of a polygon being processed. Note that as clear from the above explanation, instead of performing the vertex color calculation processing S405 after the UV value calculation processing S600 in FIG. 11, it is also possible to reverse the order of the processing or to calculate the vertex color data in the middle of calculation of the UV values.

Figure 14:
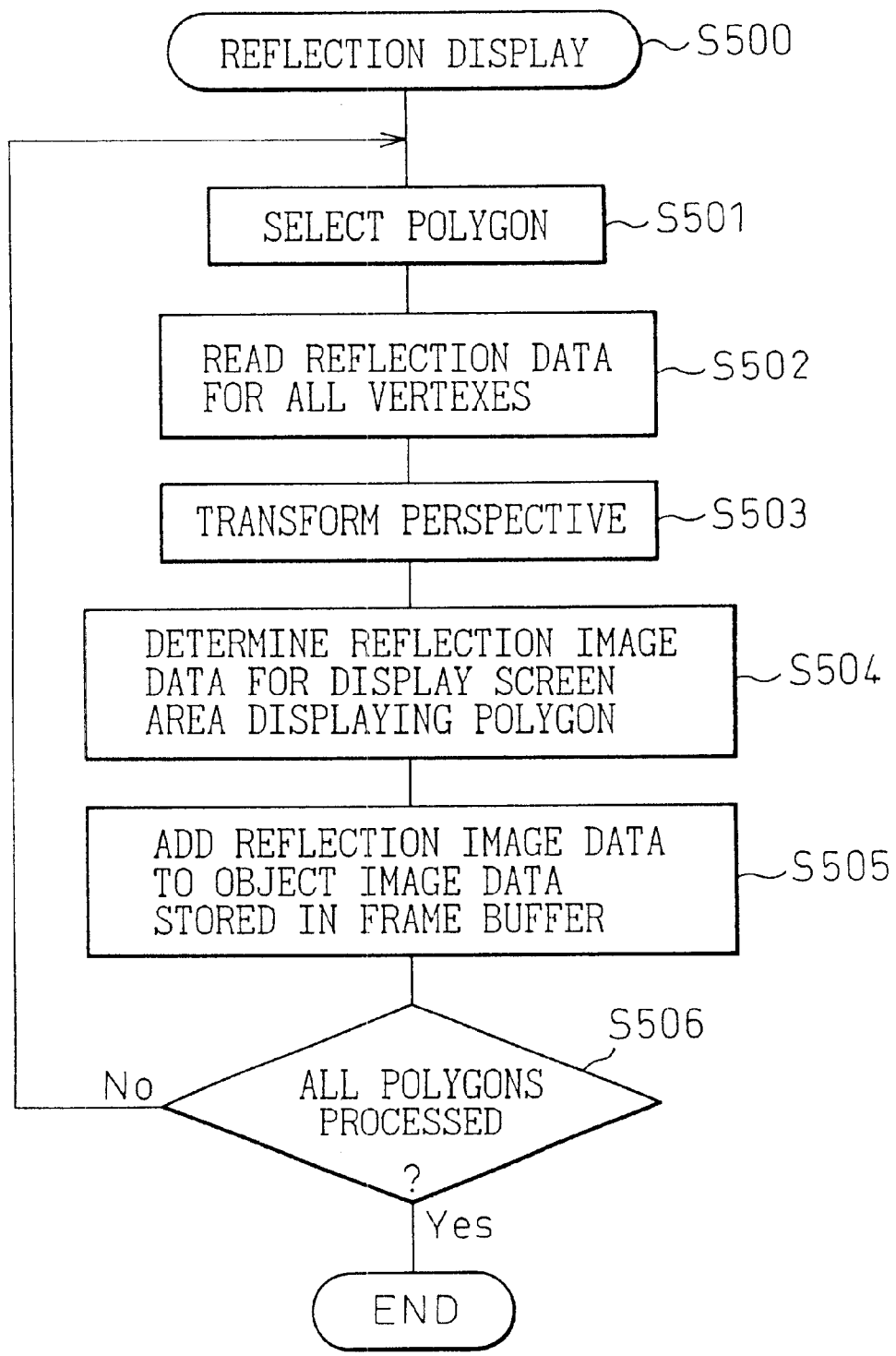
FIG. 14 is a flowchart of reflection display processing.
Figure 15A:
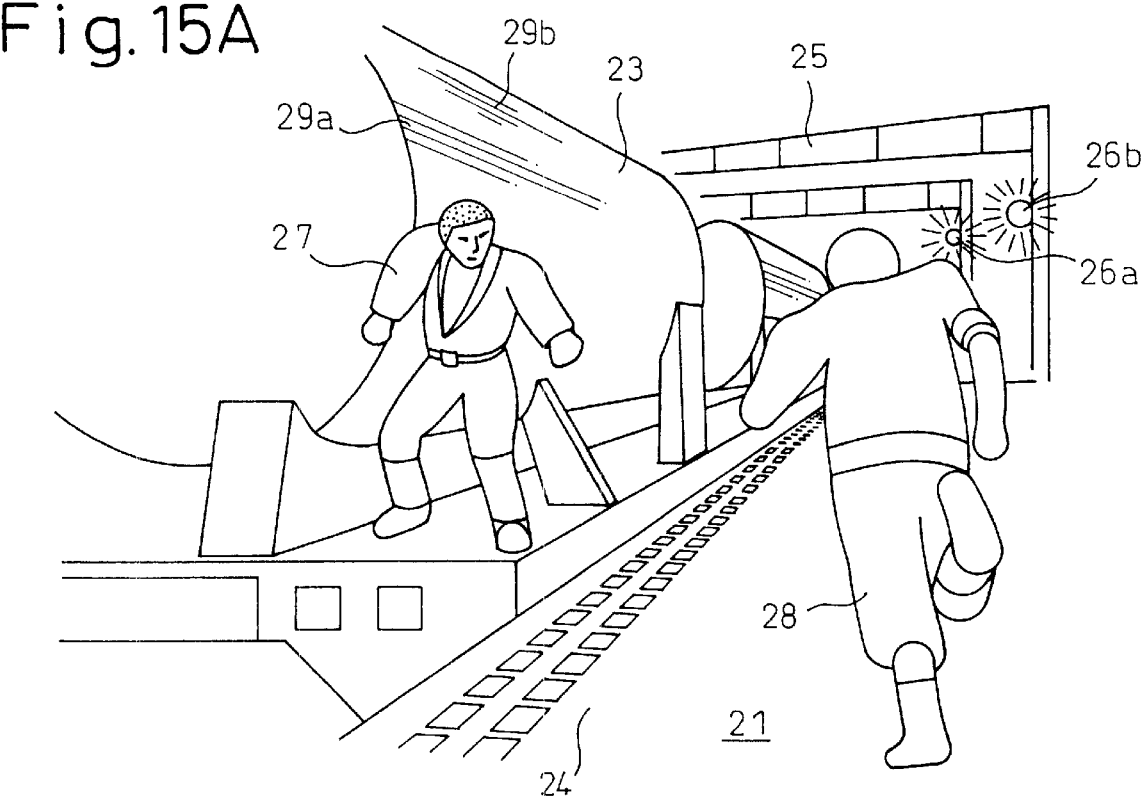
FIGS. 15A and 15B are views for explaining an example of a reflection image generated using cylindrical reflection mapping.
Figure 15B:
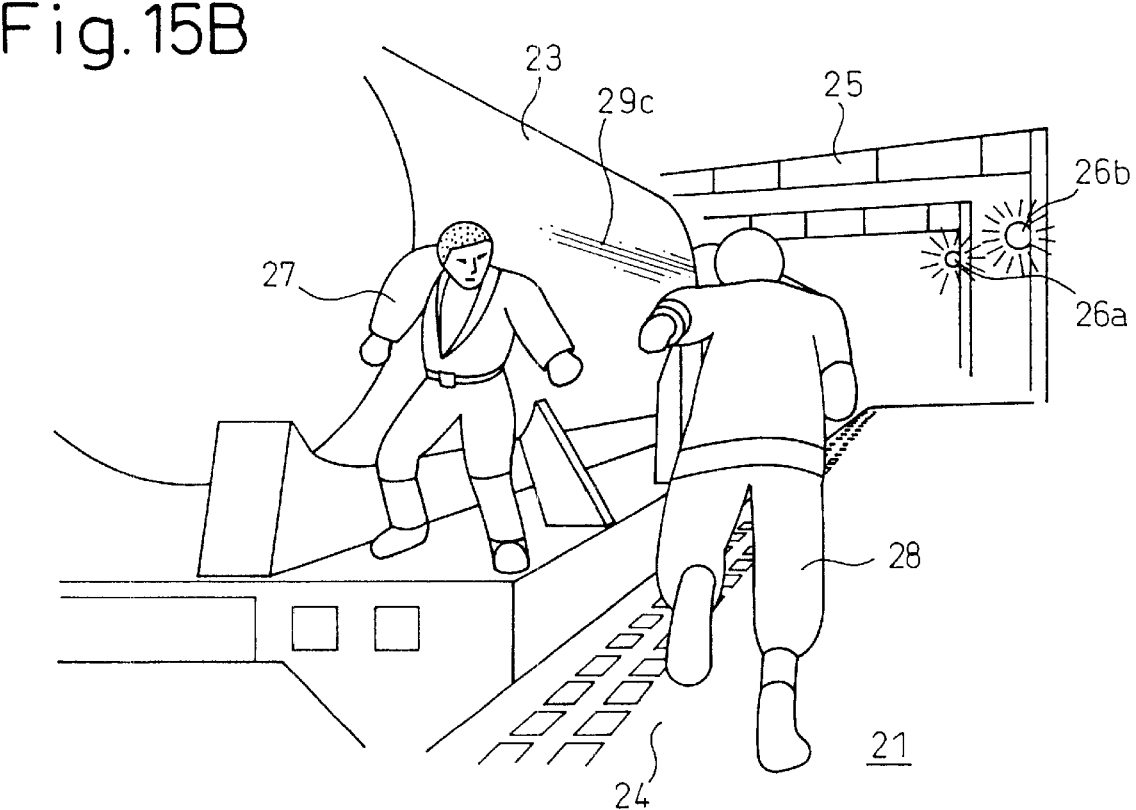
Figure 16A:
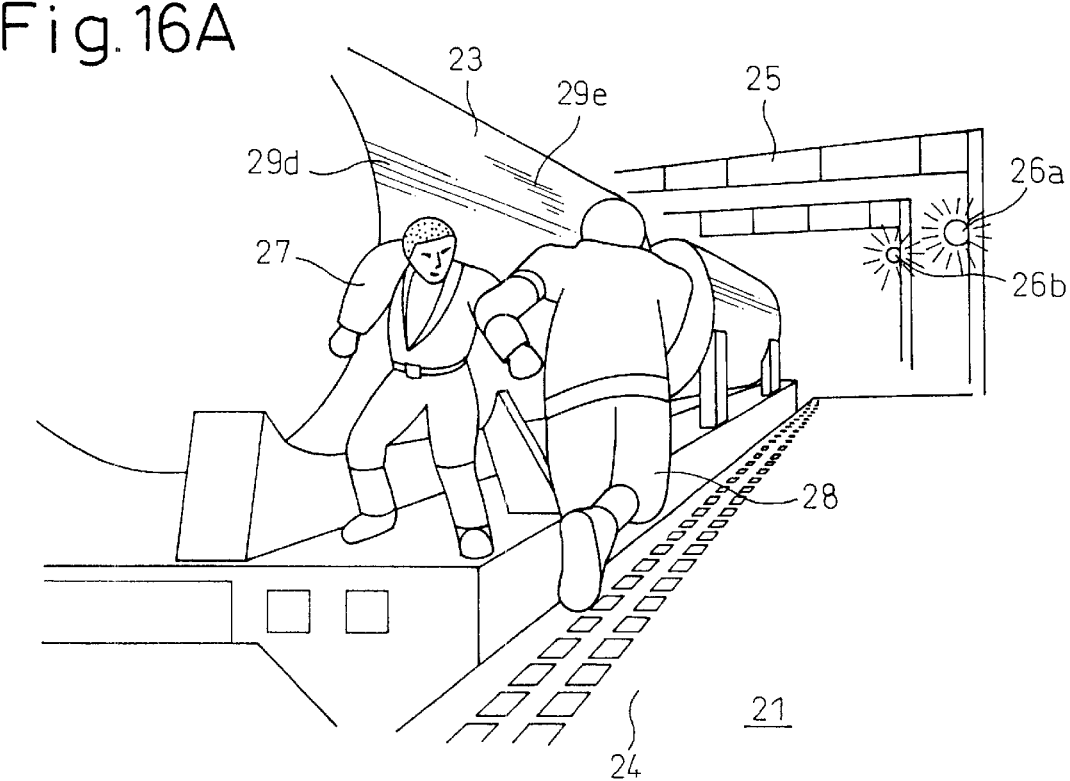
FIGS. 16A and 16B are views for explaining another example of a reflection image generated using cylindrical reflection mapping.
Figure 16B:
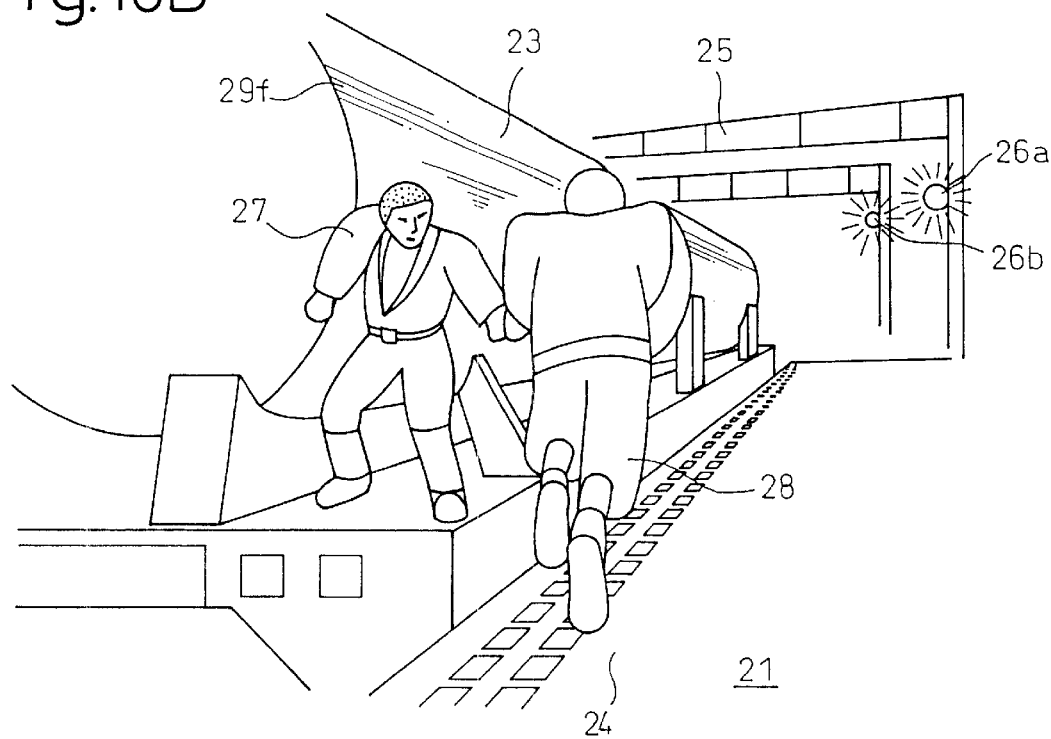

The reflection display processing S500 in the image display processing S300 shown in FIG. 10 is executed in accordance with FIG. 14. First, one of the plurality of polygons making up a reflection portion included in an object being processed in the image display processing S300 is selected (step S501). The reflection model data 140 relating to all vertexes of the polygon (FIGS. 8A and 8B) are read (step S502), the same perspective transformation is executed as for a normal object (step S503), and the display image area for the polygon is determined.

Further, the reflection image data to be displayed on the display screen area is determined (step S504). In this determination, the reflection texture data representing the reflection image portion to be displayed at the display screen area is read from the VRAM area 91 (FIG. 4) based on the set of UV values determined for each of the plurality of polygons making up the object. The read reflection texture data is changed based on the vertex color data determined for each vertex.

Note that in this embodiment, the reflection image data is determined after the perspective transformation (step S503), then perspective transformation is applied.

In this way, the reflection image data to be displayed in the display image area is generated. The method of changing the reflection texture data based on the vertex color data is the same as the method of changing the texture data for the object by the vertex color data. As a result, the clarity of the reflection image from the farther environment is lowered by a not such reflection image to give a more realistic reflection image.

Note that when the U-values given by equation 1a for each vertex for all vertexes of the polygon being processed (value of portions of U-values given from equation 1 except scroll offset) are 0 or 1.0, the image data comprised of the infinitely far color data is determined as the reflection image for the polygon based on the infinitely far color data set for the vertex color data for these vertexes without reading the reflection texture data from the VRAM 90.

The image of an object including a reflection portion being processed is already written in the not shown frame buffer in the graphic processor 104 by the object display processing S303 in the image display processing S300. The reflection image data generated at step S504 is added to the already written object image data. The reflection image for the polygon being processed in this way is superposed on the object image (step S505).

The above processing is repeated until it is judged that the processing for all polygons has ended (step S506).

As clear from the explanation of the UV value calculation processing S600 shown in FIG. 12, the value of the scroll offset $S_{of}$ is determined in accordance with the position in the direction of movement of the object shown in FIG. 3 (specifically, the Z-coordinate value). The corresponding U-value is determined in accordance with the value of the offset $S_{of}$ and the scroll parallel axis component $r_p$ of the reflection vector. Further, the V-value is determined in accordance with the scroll vertical axis component $r_v$ and the scroll horizontal axis component $r_h$ of the reflection vector.

As a result, the UV values belonging to the movable UV area 80M (FIG. 4) corresponding to the position of the object are calculated for all vertexes of the object. Further, since the calculation is performed for U based on a divisor of 1, finally the UV values belonging to the reference UV area 80 (FIG. 4) are calculated for all vertexes of the object. Accordingly, the reflection texture data in the VRAM area 91 corresponding to all vertexes is determined.

When the position of the object changes, the scroll offset $S_{of}$ changes, so the U-value found for each vertex of each polygon of the object changes and the corresponding reflection image also changes. Therefore, the reflection image displayed on the same point of the object changes and the reflection image is displayed so as to appear to flow on the object.

FIGS. 15A and 15B and FIGS. 16A and 16B show an example of the game screen 21 using the cylindrical reflection mapping shown in the above embodiment. In these figures, 23 indicates a train, 24 a platform, 25 a tower, 26a and 26b outdoor lights, and 27 and 28 characters in a game. The train proceeds in the depth direction of the paper in the order of FIG. 15A, FIG. 15B, FIG. 16A, and FIG. 16B. The state is shown where the character 28 runs on the platform 24 chasing after the train 23, while the character 27 on the train is extending its arm. The camera of the game moves forward along with the train. Light from the surrounding lights 26a and 26b are reflected on the cylindrical body of the freight train 23. The reflection images 29a to 29f generated from there are displayed. As will be understood from the figure, these reflection images change even when the train 23 is moving forward.

On the other hand, when the viewpoint tracks the movement of the object, the reflection vector for the same vertex of the same polygon on the object does not change. Since the value of the scroll offset $S_{of}$ changes, the corresponding U-value changes. Therefore, in this case as well, the reflection image is displayed so as to appear to flow on the object and the display of the reflection image becomes more realistic.

Further, as explained at the vertex color calculation processing S405 (FIG. 11), the reflection image is changed so that the larger the size of the movement direction component of the reflection vector, the close the color of the reflection image to the far color data. As a result, the reflection image derived from the farther environment is weakened and the display of the reflection image becomes more realistic.

The present invention is not limited to the above embodiments. It is of course possible to suitably modify or change these embodiments within a scope not out of the gist of the invention.

For example, at step S505 for combining by addition the reflection image and the object image at the reflection display processing S500 shown in FIG. 14, instead of simple addition, it is also possible to add the images while weighting one of the same. Further, it is of course also possible to adopt a method of combination other than addition.

Further, in the above embodiments, it was assumed that the direction of movement of the object matched one of the axes of the three-dimensional virtual space, but the invention may also be applied to the case where the direction of movement of the object is another direction. In this case, the method may also be considered of rotating the object until it becomes parallel with one of the axes of the three-dimensional virtual space, executing the processing shown in the above embodiments for the rotated object, rotate the object in the reverse direction, and display the reflection image obtained as a result of the above processing superposed.

Note that in the above embodiments, the processing for reflection calculation was performed in the order of the polygons. That is, the polygons belonging to the reflection portion of the object were successively selected and the reflection calculation (calculation of UV values and vertex color) performed successively for the plurality of vertexes making up the selected polygons. After the end of the reflection calculation, the processing for display of the reflection image of a polygon was performed for the successively different polygons. However, the present invention is not limited to this order of calculation.

For example, it is also possible to successively execute reflection calculation (calculation of the UV and vertex color) for all vertexes making up the reflection portion and then use the results of the reflection calculation for the vertexes making up the polygons for the successively different polygons so as to display the polygons.

The computer making up part of the game console show in the above embodiments may also be provided with a logic circuit for executing part of the finctions of the game program used there. Further, along with this, it is also possible to change the game program so as to change the method of execution of the functions of the game program used there.

In the above embodiments of the present invention, the keypad and television set were provided separate from the game console. One or both of the keypad and the television set, however, may be made integral with the game console. Further, it is also possible to use another input device or display device. Further, the program product used in the game console may also be permanently built into the game console rather than detachable from the game console.

The program product according to the present invention or the program product used in the game console according to the present invention is not limited to a CD-ROM and may be any computer readable program product. For example, it may be a DVD, magnetic recording medium, semiconductor memory, or other optical recording medium.

In the above embodiments, a home game system was used as a platform, but the game system according to the present invention may also be realized using a personal computer or other general use computer or arcade game machine as a platform. Further, it may also be realized using a mobile phone, portable data terminal, car navigation system, or other communications terminal as a platform.

Summarizing the effects of the invention, according to the present invention, it is possible to make a reflection image reflected on an object from the environment change even when the camera tracks the object moving in the game and thereby make the display of the reflection image more real.

While the invention has been described by reference to specific embodiments chosen for purposes of illustration, it should be apparent that numerous modifications could be made thereto by those skilled in the art without departing from the basic concept and scope of the invention.

What is claimed is:

1. An object display method for displaying an object from a direction of a viewpoint in a virtual three-dimensional space of a video game, comprising:

making said viewpoint and an object arranged in a cylinder, on the inner surface of which a reflection image expressing the environment is provided, move in accordance with predetermined rules or player operation;

judging a partial area of said cylinder to be provided with a reflection image to be reflected on said object in accordance with the positions of said viewpoint and said object; and displaying the image linked with the determined partial area of said cylinder combined with the image of said object.

2. An object display method as set forth in claim 1, wherein:

said object is comprised of a plurality of polygons, said judgement determines a reflection vector for each vertex based on a positional relationship between a position of said viewpoint and a plurality of vertexes of each polygon and judges a partial area of said cylinder linked with each polygon based on a reflection vector determined for each vertex, and in the display of the image, an image linked with the determined partial area of the cylinder is synthesized for each partial area of each polygon.

3. An object display method as set forth in claim 1, wherein the same reflection image is repeatedly provided to the cylinder in a direction parallel to the inner surface.

4. An object display method as set forth in claim 1, wherein in the movement of said viewpoint and object, the viewpoint is made to track the movement of the object.

5. A computer readable computer product storing a program for displaying an object from a viewpoint in a three-dimensional space of a video game, said program making said computer:

make said viewpoint and an object arranged in a cylinder, on the inner surface of which a reflection image expressing the environment is provided, move in accordance with predetermined rules or player operation;

judging a partial area of said cylinder to be provided with a reflection image to be reflected on said object in accordance with the positions of said viewpoint and said object; and displaying the image linked with the determined partial area of said cylinder combined with the image of said object.

6. A program product as set forth in claim 5, wherein:

said object is comprised of a plurality of polygons, said judgement determines a reflection vector for each vertex based on a positional relationship between a position of said viewpoint and a plurality of vertexes of each polygon and judges a partial area of said cylinder linked with each polygon based on a reflection vector determined for each vertex, and in the display of the image, an image linked with the determined partial area of the cylinder is synthesized for each partial area of each polygon.

7. A program product as set forth in claim 5, wherein the same reflection image is repeatedly provided to the cylinder in a direction parallel to the inner surface.

8. A program product as set forth in claim 5, wherein in the movement of said viewpoint and object, the viewpoint is made to track the movement of the object.

9. A program for displaying an object from a viewpoint in a three-dimensional space of a video game, said program making a computer:

make said viewpoint and an object arranged in a cylinder, on the inner surface of which a reflection image expressing the environment is provided, move in accordance with predetermined rules or player operation;

judging a partial area of said cylinder to be provided with a reflection image to be reflected on said object in accordance with the positions of said viewpoint and said object; and displaying the image linked with the determined partial area of said cylinder combined with the image of said object.

10. A program as set forth in claim 9, wherein:

said object is comprised of a plurality of polygons, said judgement determines a reflection vector for each vertex based on a positional relationship between a position of said viewpoint and a plurality of vertexes of each polygon and judges a partial area of said cylinder linked with each polygon based on a reflection vector determined for each vertex, and in the display of the image, an image linked with the determined partial area of the cylinder is synthesized for each partial area of each polygon.

11. A program as set forth in claim 9, wherein the same reflection image is repeatedly provided to the cylinder in a direction parallel to the inner surface.

12. A program as set forth in claim 9, wherein in the movement of said viewpoint and object, the viewpoint is made to track the movement of the object.

13. A video game system comprising:

a computer readable program product storing a program for displaying an object from a viewpoint in a three-dimensional space of a video game;

a computer for executing at least part of a program from said program product; and a display for displaying a video game executed by said computer;

said computer reading at least part of a program from said program product, making said viewpoint and an object arranged in a cylinder, on the inner surface of which a reflection image expressing the environment is provided, move in accordance with predetermined rules or player operation;

judging a partial area of said cylinder to be provided with a reflection image to be reflected on said object in accordance with the positions of said viewpoint and said object; and displaying the image linked with the determined partial area of said cylinder combined with the image of said object on said display.

14. A game system as set forth in claim 13, wherein:

said object is comprised of a plurality of polygons, said judgement determines a reflection vector for each vertex based on a positional relationship between a position of said viewpoint and a plurality of vertexes of each polygon and judges a partial area of said cylinder linked with each polygon based on a reflection vector determined for each vertex, and in the display of the image, an image linked with the determined partial area of the cylinder is synthesized for each partial area of each polygon.

15. A game system as set forth in claim 13, wherein the same reflection image is repeatedly provided to the cylinder in a direction parallel to the inner surface.

16. A game system as set forth in claim 13, wherein in the movement of said viewpoint and object, the viewpoint is made to track the movement of the object.

* * * * *

UNITED STATES PATENT AND TRADEMARK OFFICE
CERTIFICATE OF CORRECTION

PATENT NO. : 6,402,615 B1
DATED : June 11, 2002
INVENTOR(S) : Takeuchi et al.

It is certified that error appears in the above-identified patent and that said Letters Patent is hereby corrected as shown below:

<u>Title page,</u>
Item [*] Notice, delete the phrase "by 0 days" and insert -- by 48 days --

Signed and Sealed this

Twenty-eighth Day of September, 2004

JON W. DUDAS
*Director of the United States Patent and Trademark Office*